July 16, 1940.  R. W. BROWN  2,208,537
ART OF VEHICLE SUSPENSION
Filed Sept. 17, 1937  21 Sheets-Sheet 3

Inventor
Roy W. Brown
BY Albert R. Ely
Attorney

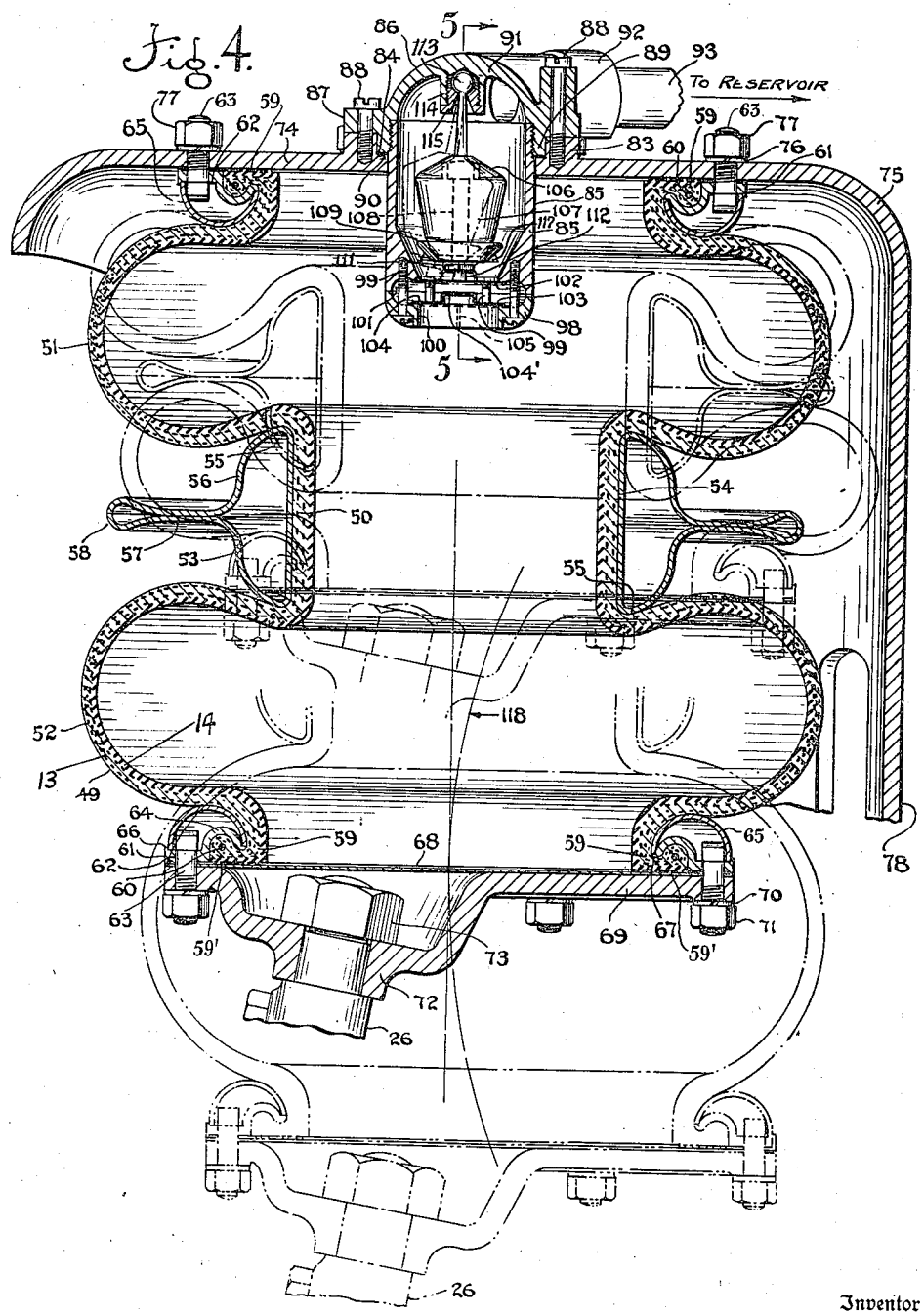

July 16, 1940.   R. W. BROWN   2,208,537
ART OF VEHICLE SUSPENSION
Filed Sept. 17, 1937   21 Sheets-Sheet 5
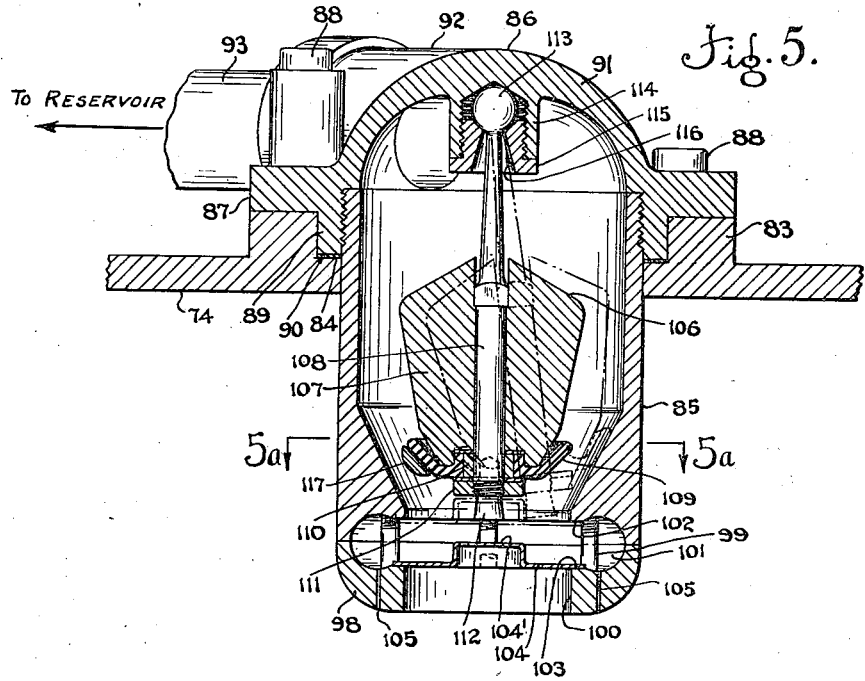
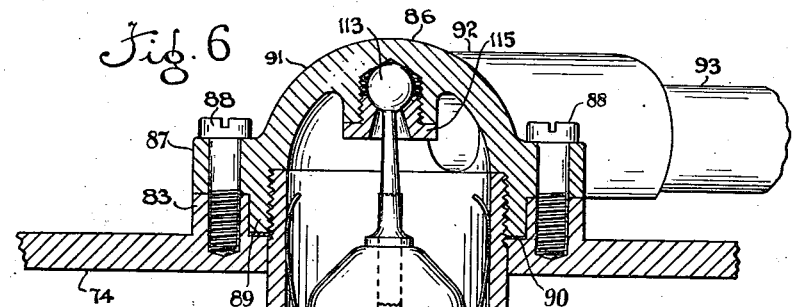
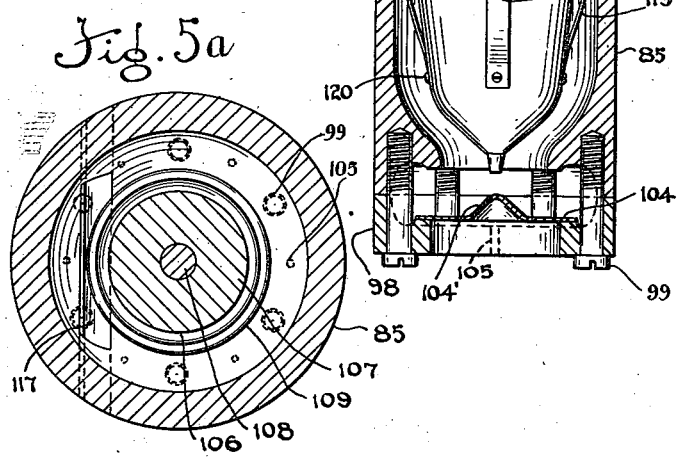
Inventor
Roy W. Brown
By Albert L. Ely
Attorney

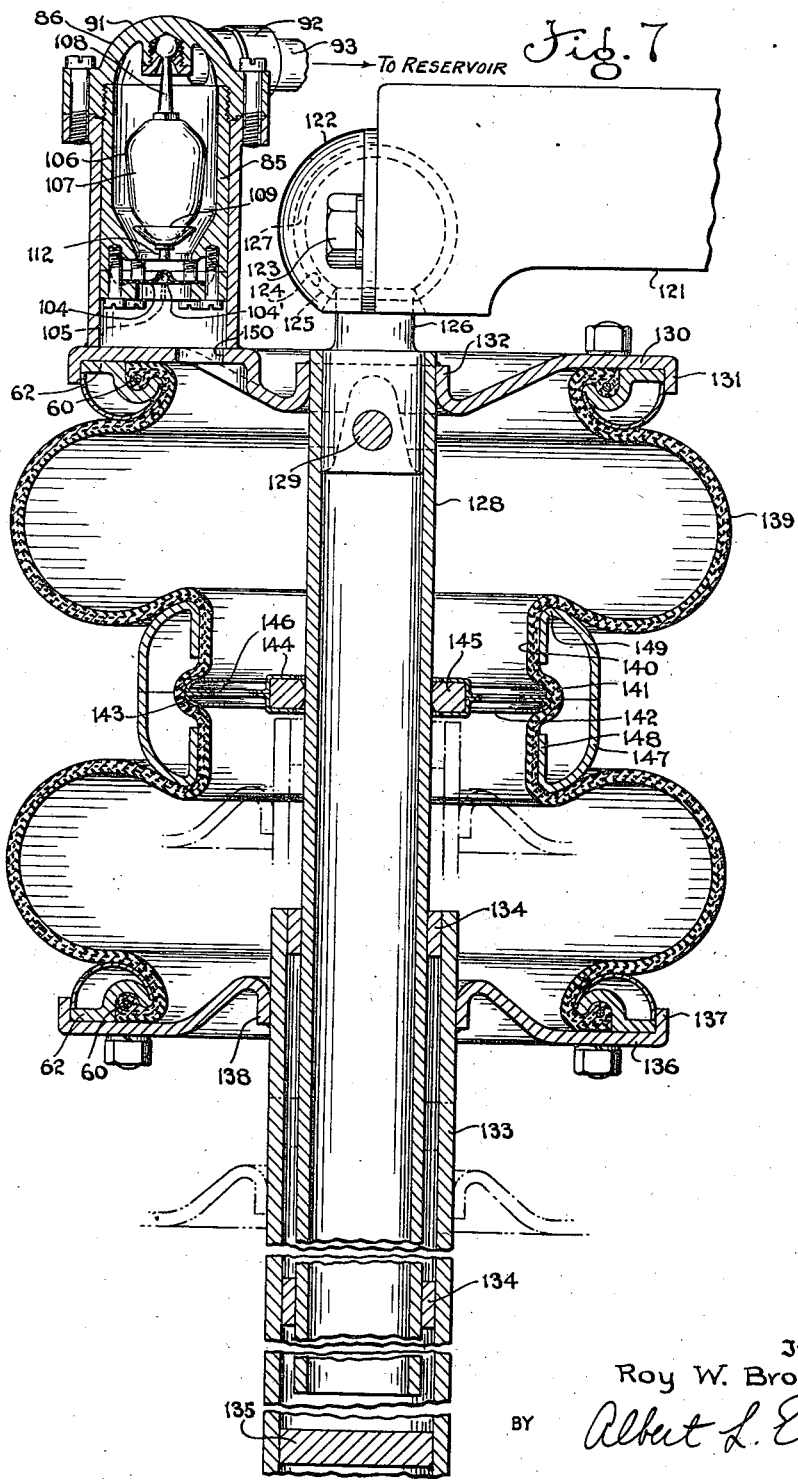

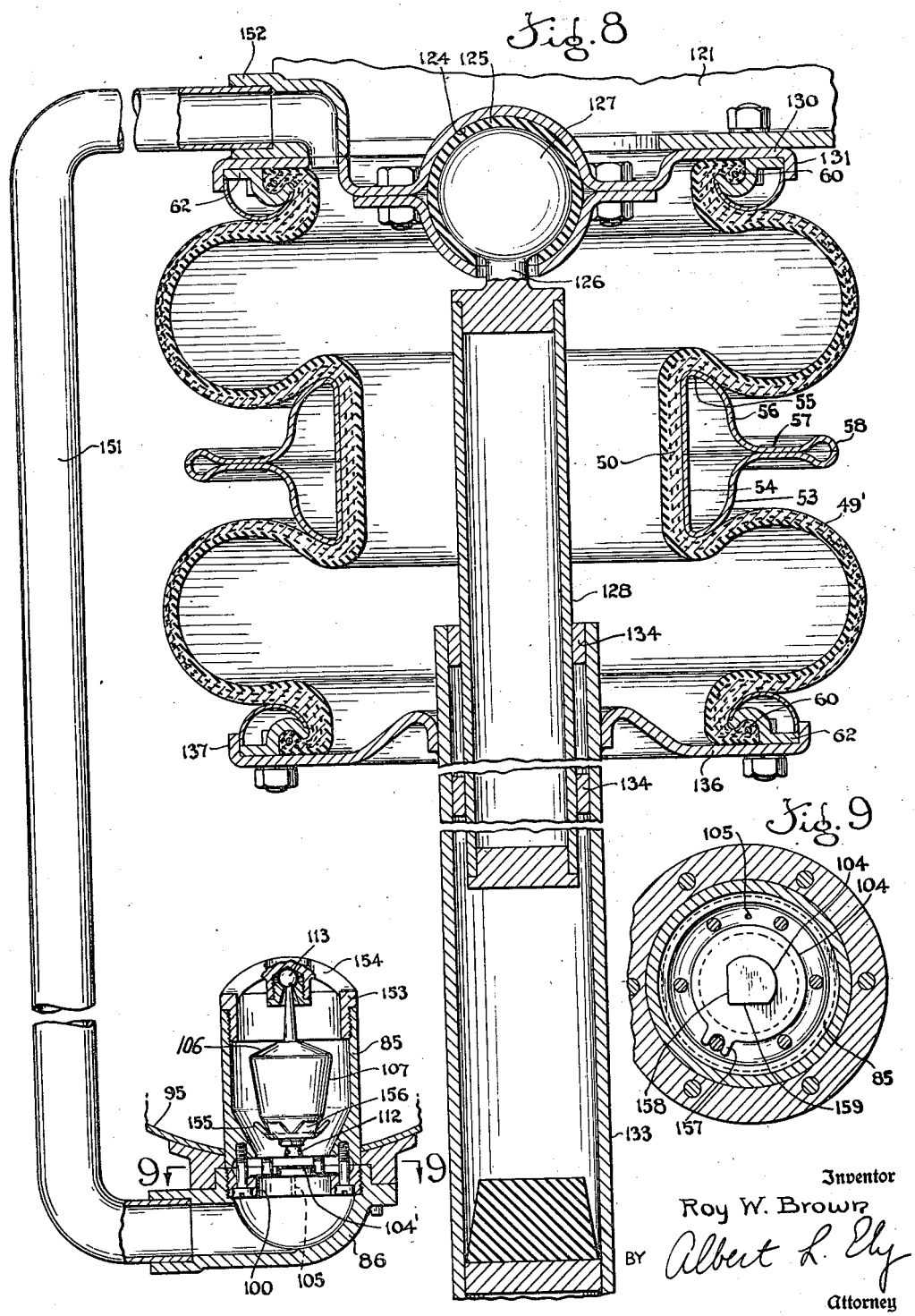

July 16, 1940.  R. W. BROWN  2,208,537
ART OF VEHICLE SUSPENSION
Filed Sept. 17, 1937  21 Sheets-Sheet 8
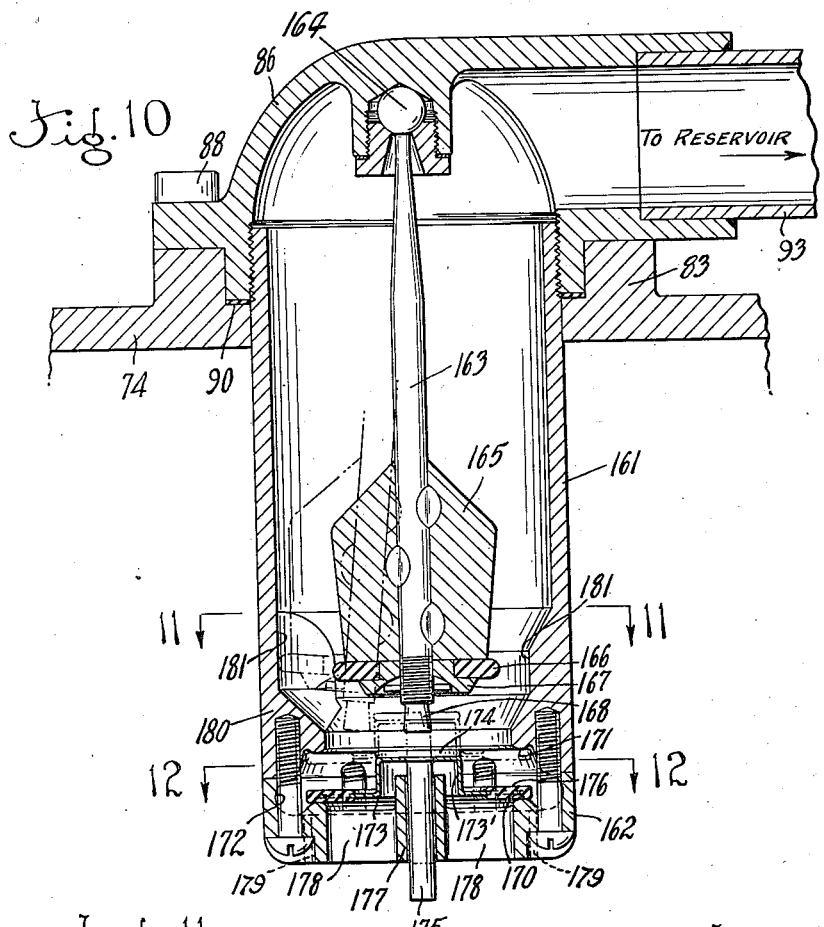
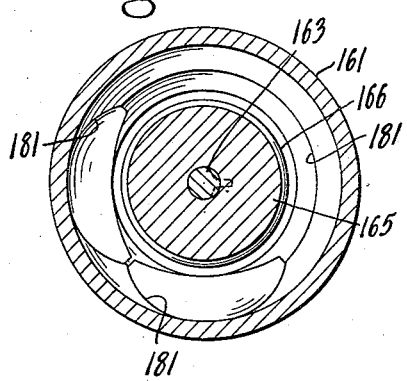
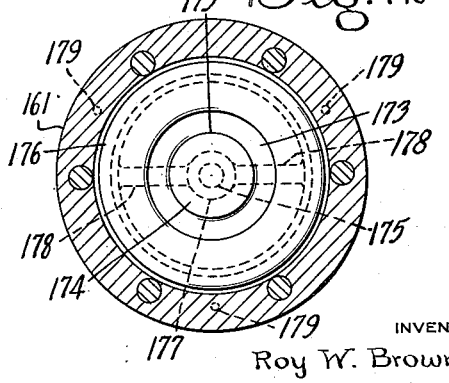
INVENTOR
Roy W. Brown
BY Albert L. Ely
ATTORNEY July 16, 1940.   R. W. BROWN   2,208,537
ART OF VEHICLE SUSPENSION
Filed Sept. 17, 1937   21 Sheets-Sheet 9
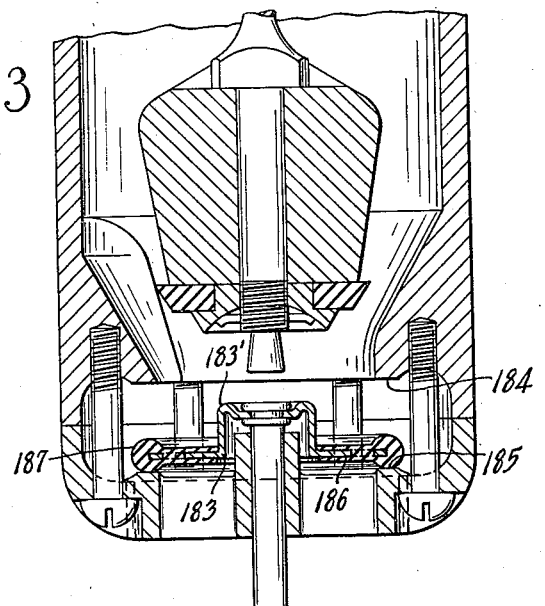
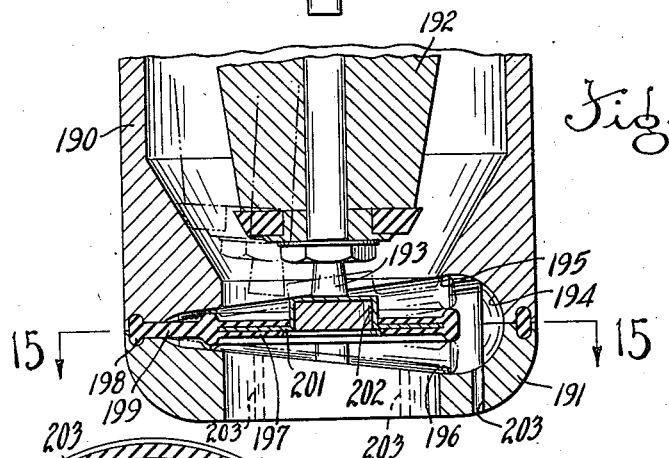
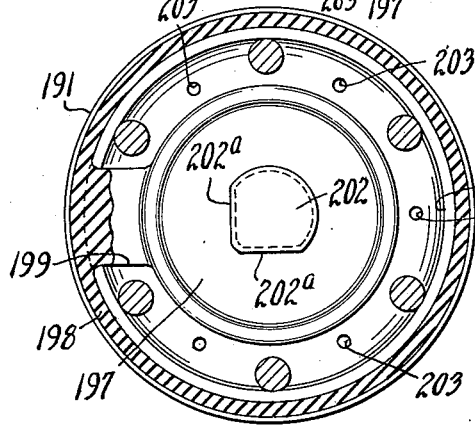
INVENTOR
Roy W. Brown
BY Albert L. Ely
ATTORNEY

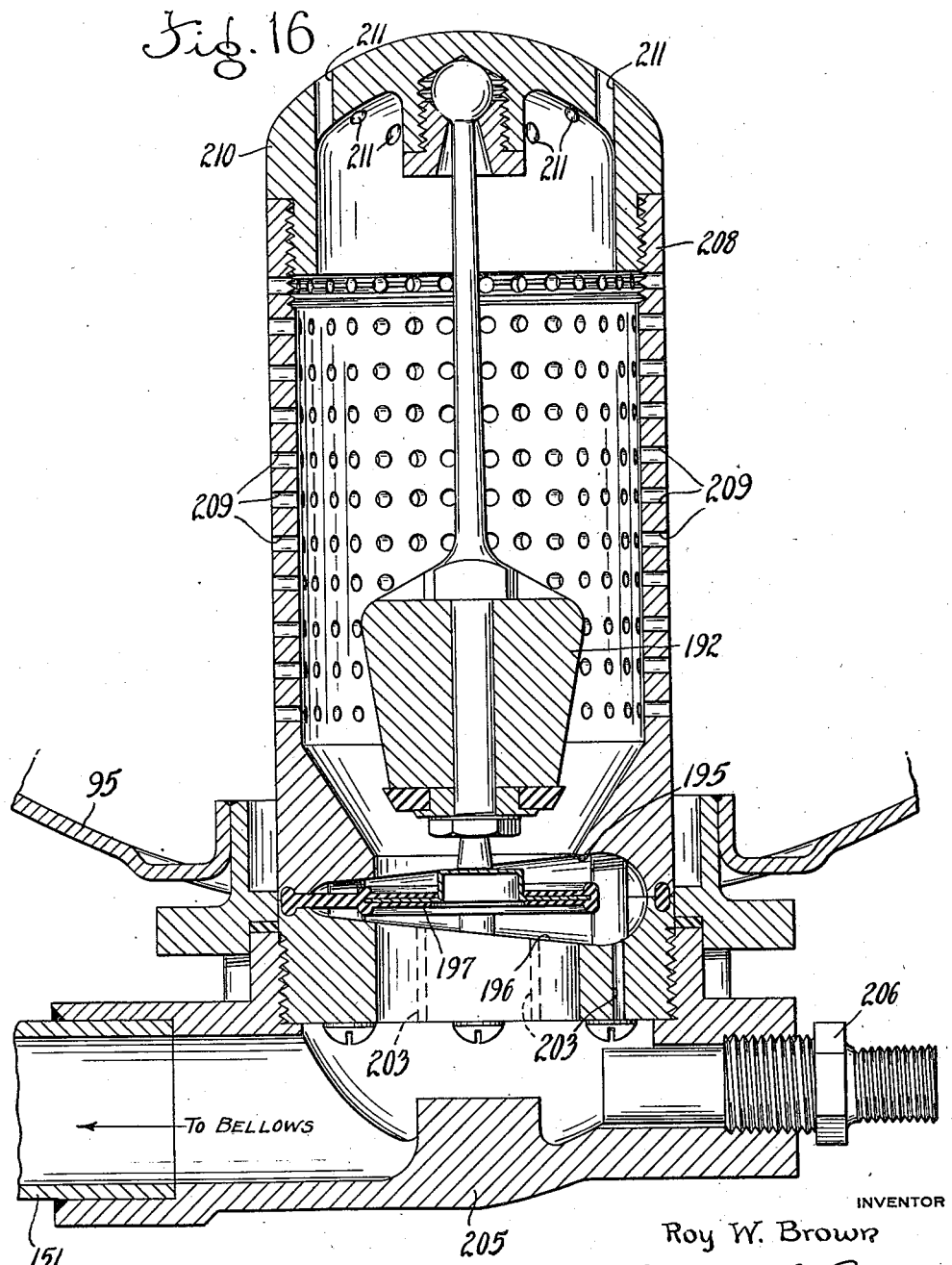

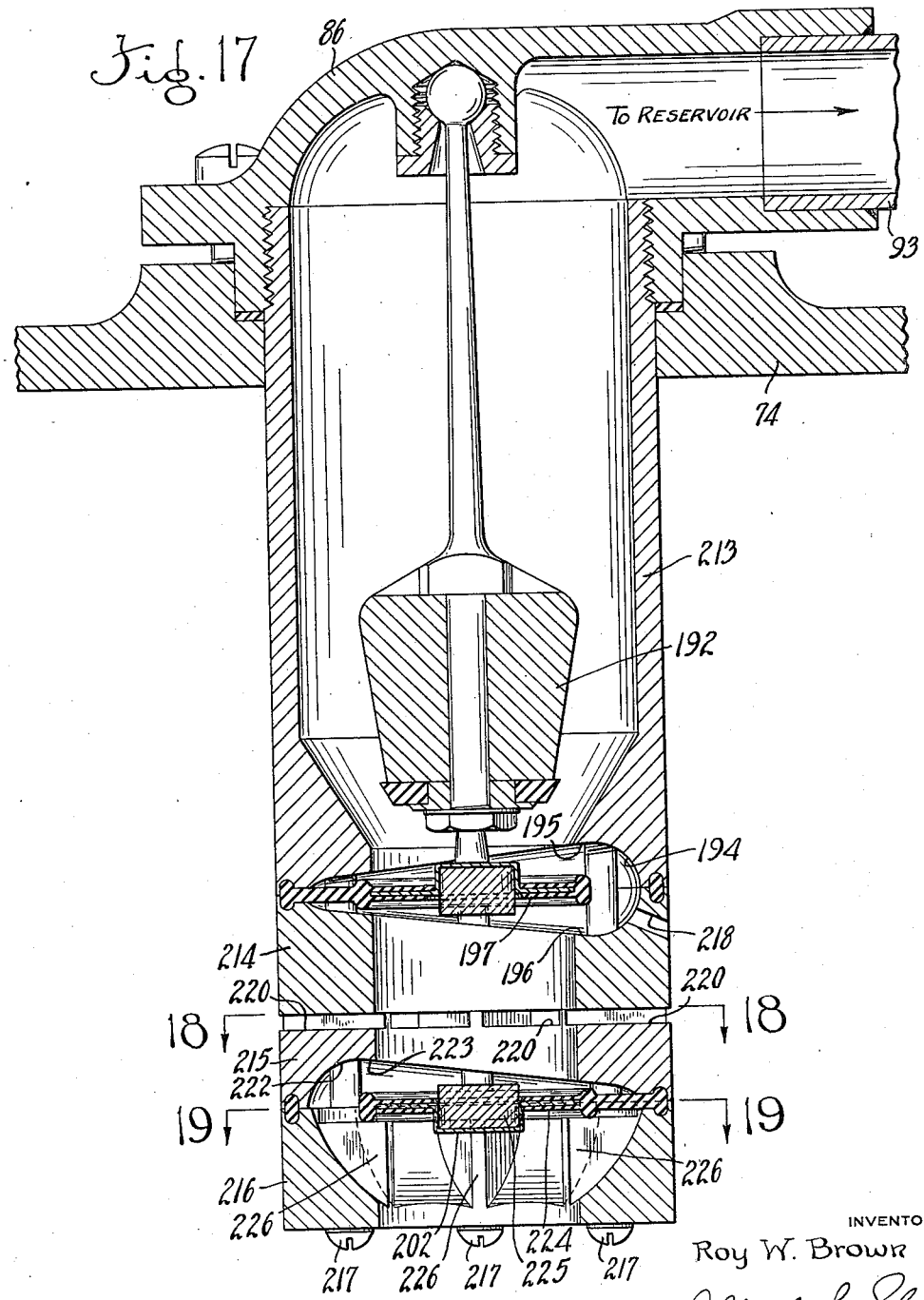

July 16, 1940.  R. W. BROWN  2,208,537
ART OF VEHICLE SUSPENSION
Filed Sept. 17, 1937  21 Sheets-Sheet 12
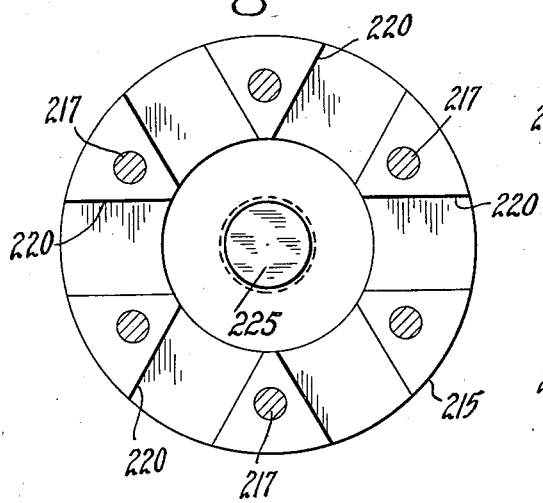
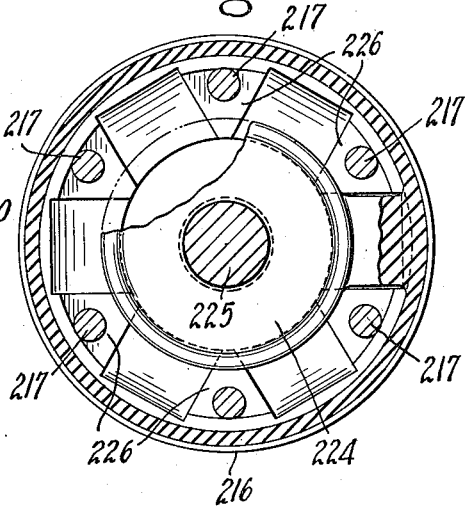
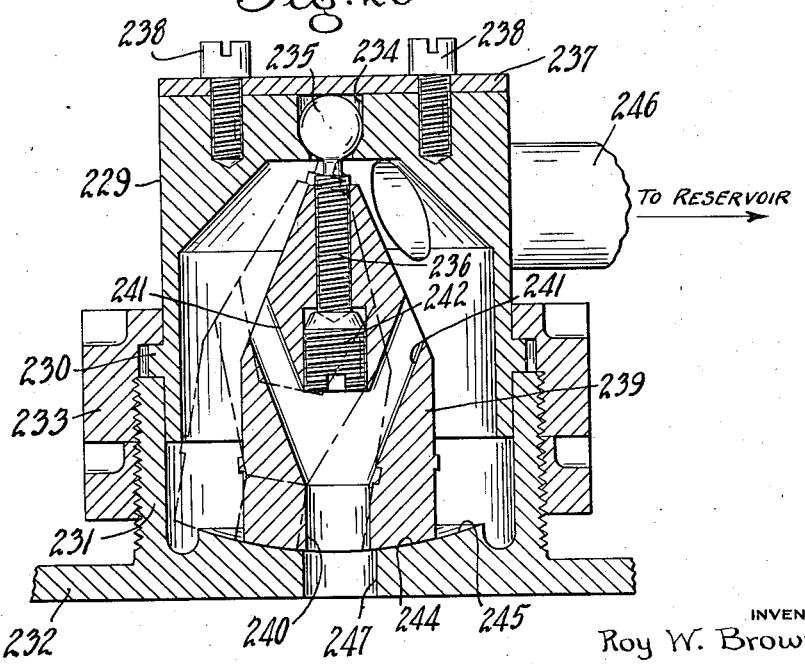
INVENTOR
Roy W. Brown
BY Albert L. Ely
ATTORNEY July 16, 1940.  R. W. BROWN  2,208,537
ART OF VEHICLE SUSPENSION
Filed Sept. 17, 1937   21 Sheets-Sheet 13
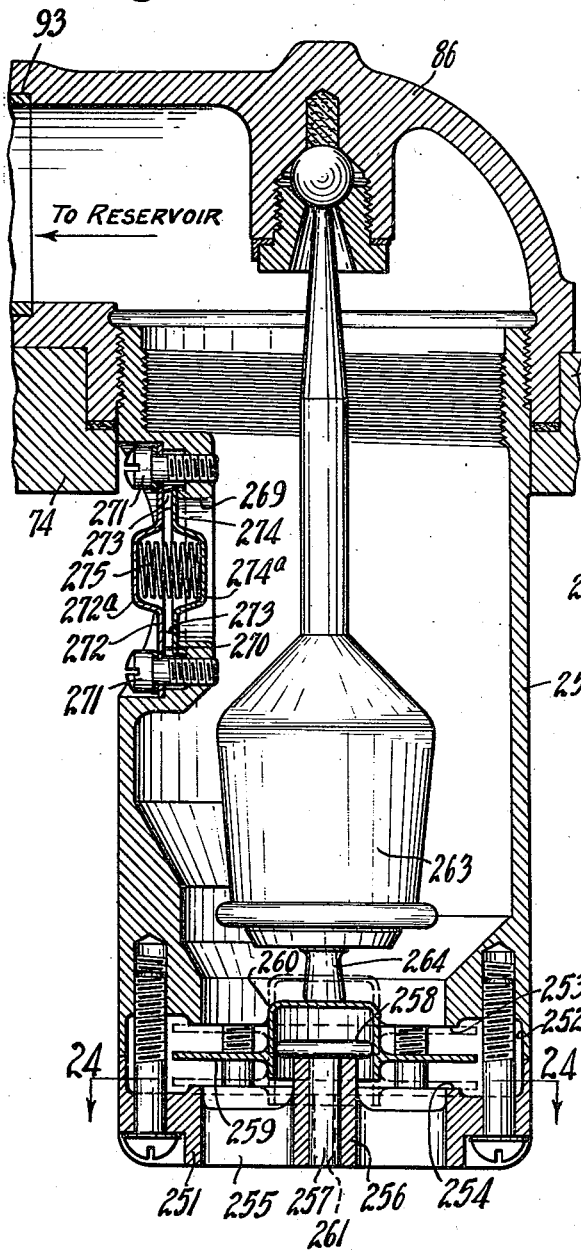
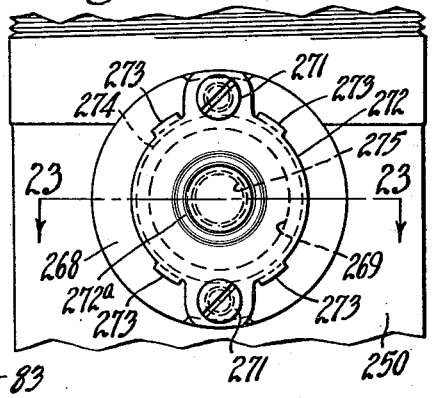
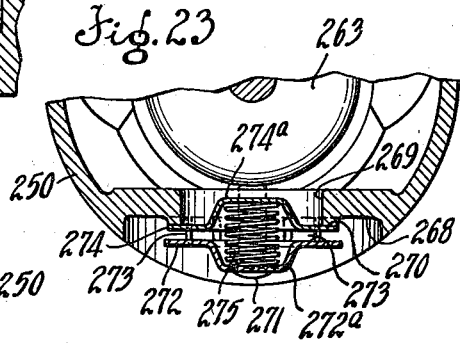
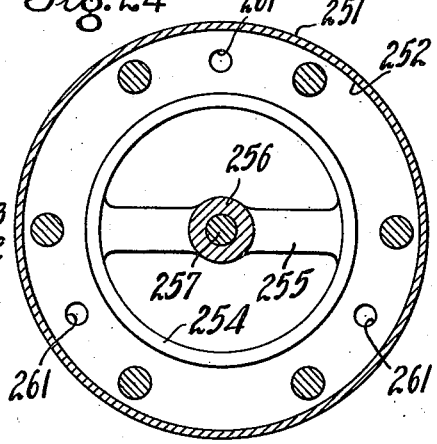
INVENTOR
Roy W. Brown
BY
Albert L. Ely
ATTORNEY

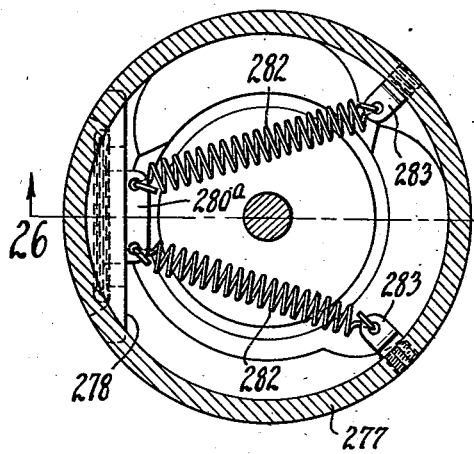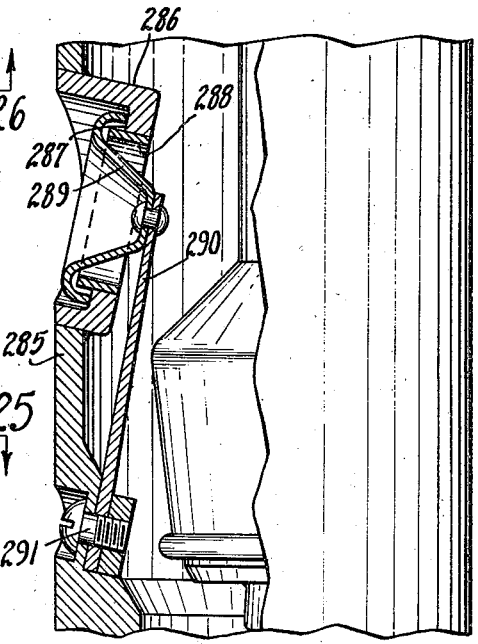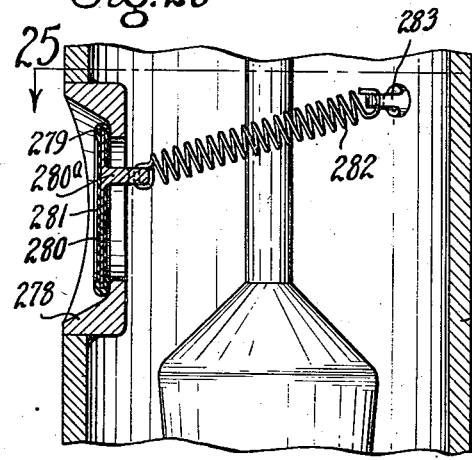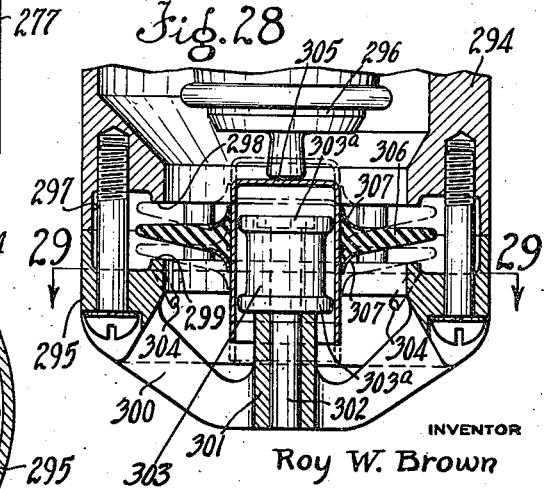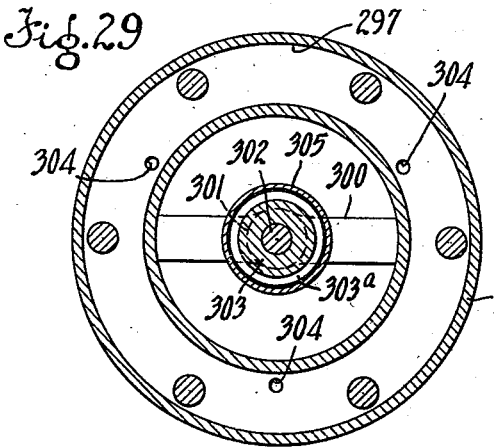

July 16, 1940.  R. W. BROWN  2,208,537
ART OF VEHICLE SUSPENSION
Filed Sept. 17, 1937  21 Sheets-Sheet 15
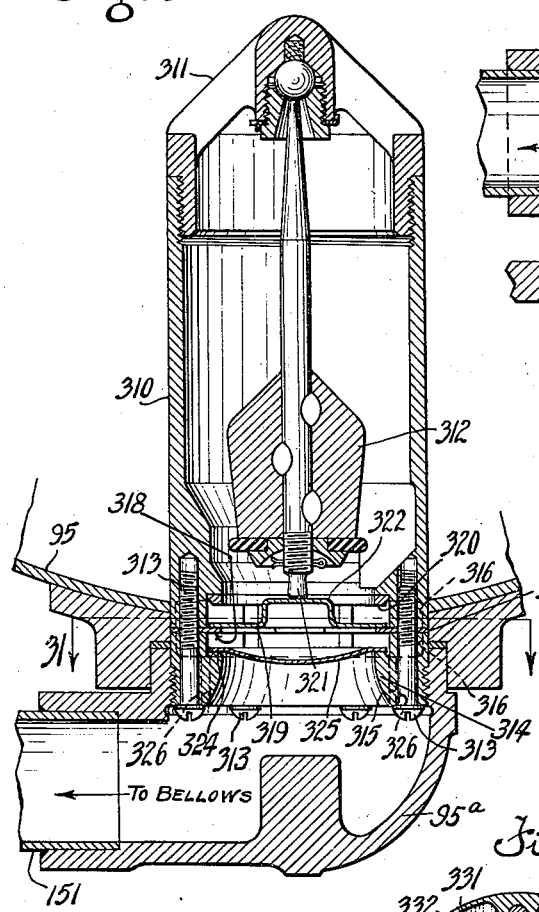
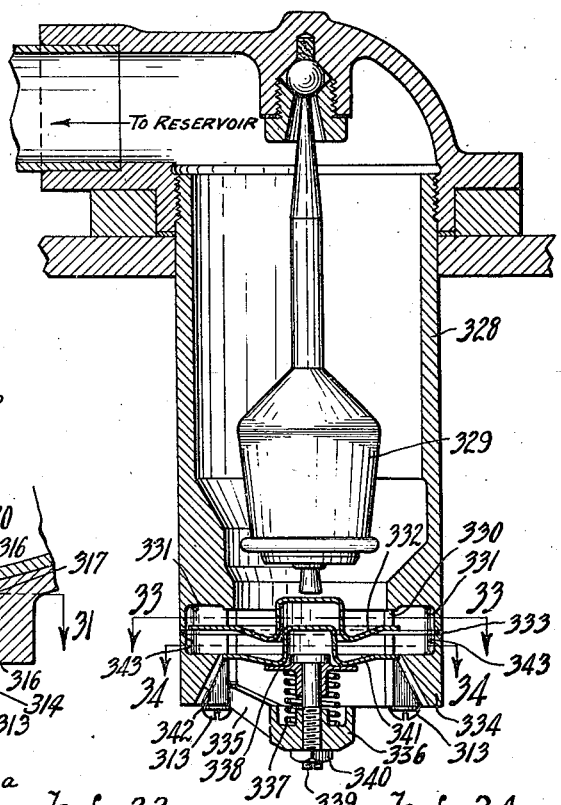
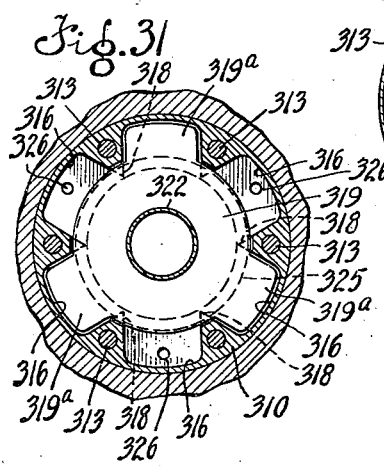
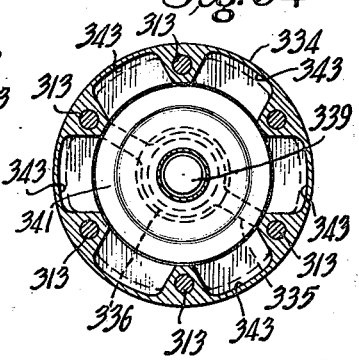
INVENTOR
Roy W. Brown
BY Albert R. Ely
ATTORNEY

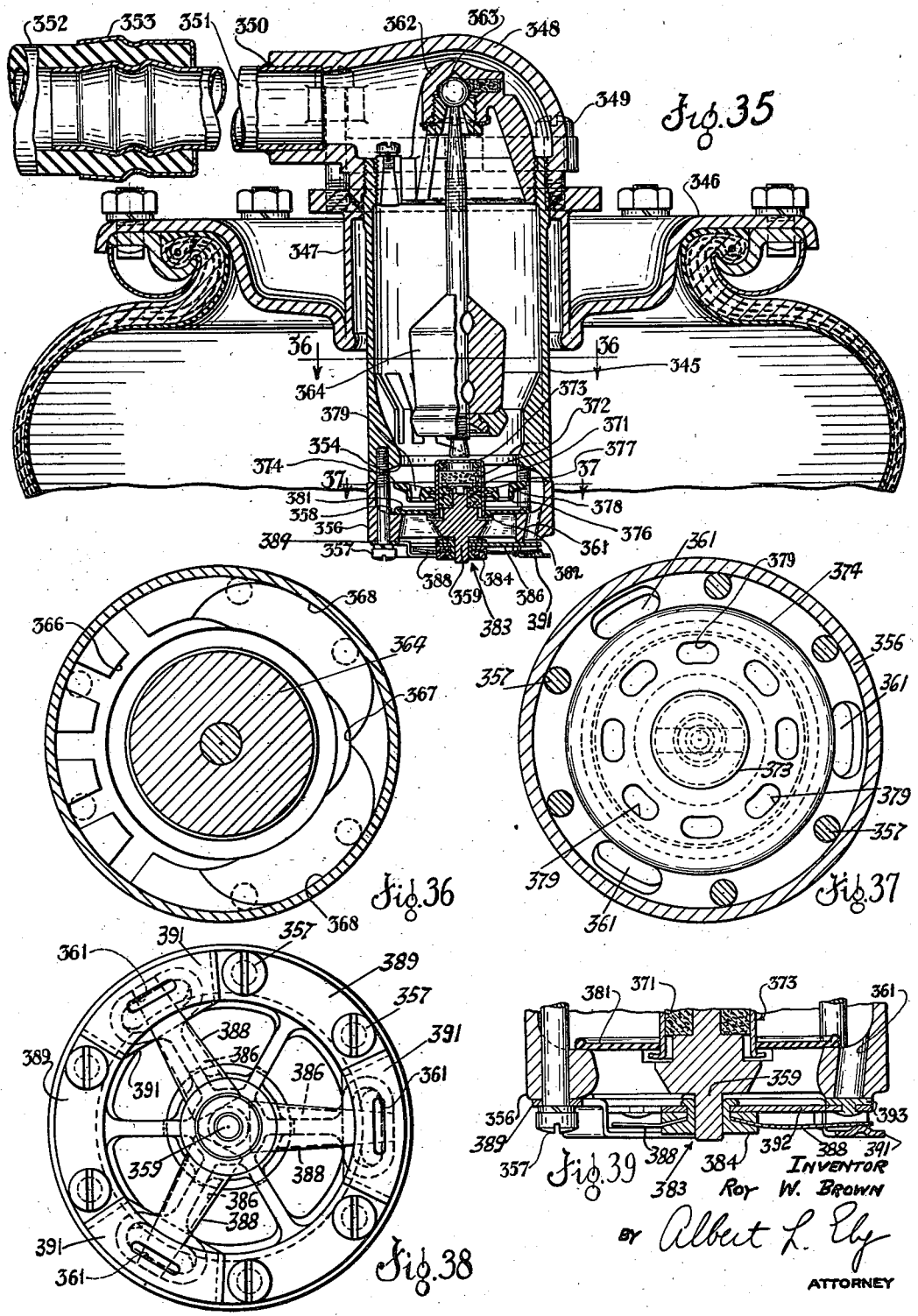

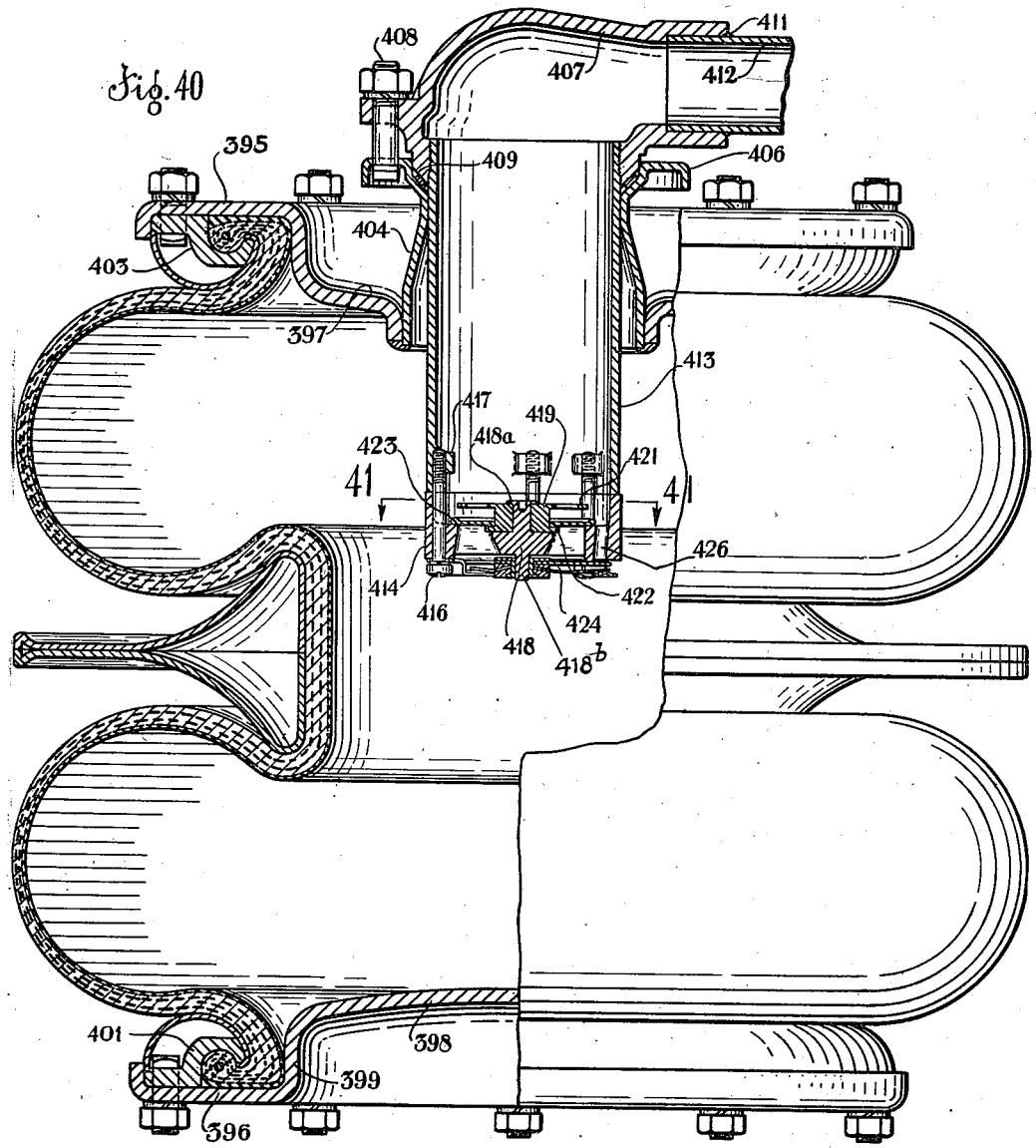

July 16, 1940. R. W. BROWN 2,208,537
ART OF VEHICLE SUSPENSION
Filed Sept. 17, 1937 21 Sheets-Sheet 18

INVENTOR
Roy W. Brown
BY Albert R. Ely
ATTORNEY

July 16, 1940.   R. W. BROWN   2,208,537
ART OF VEHICLE SUSPENSION
Filed Sept. 17, 1937   21 Sheets-Sheet 19
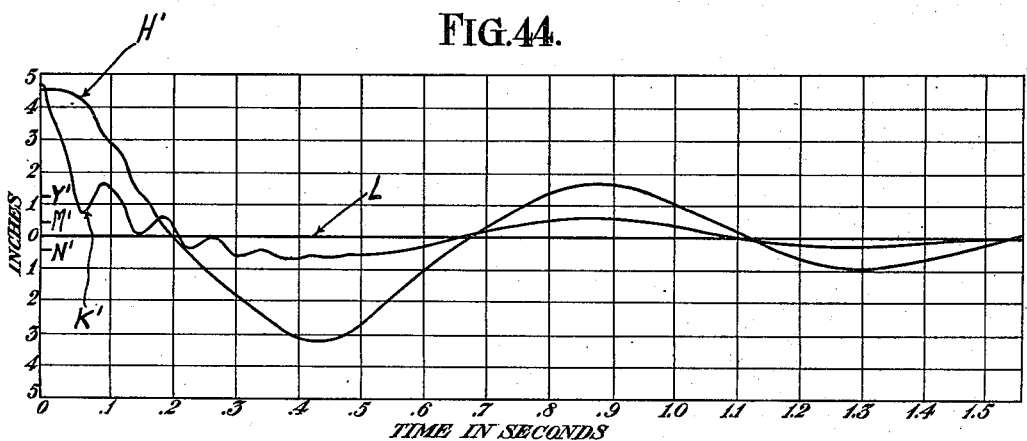
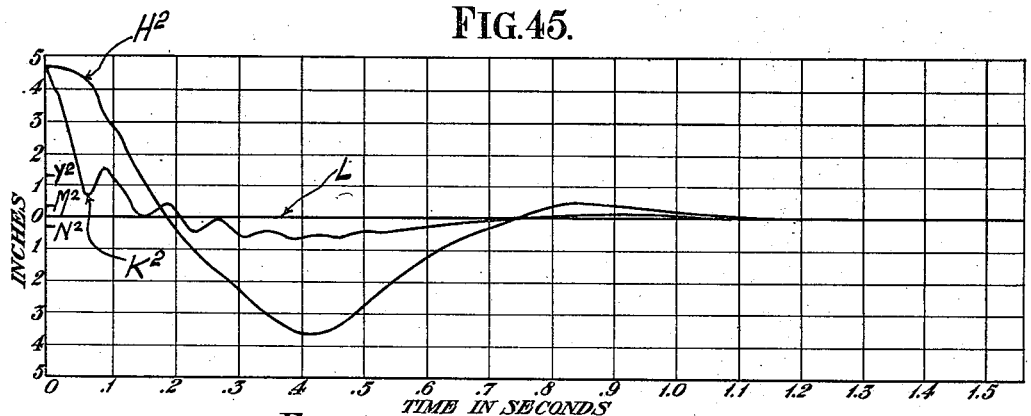
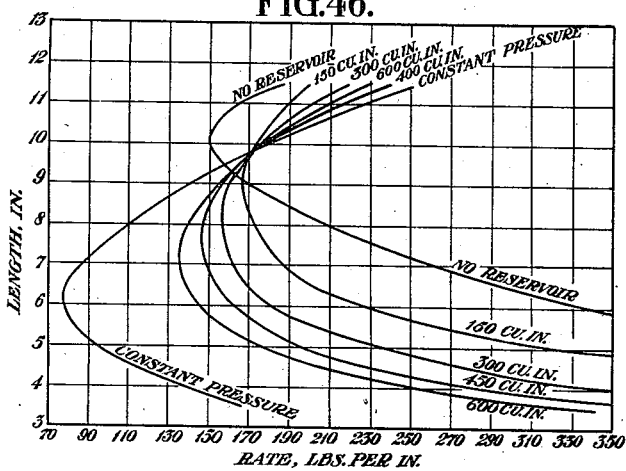
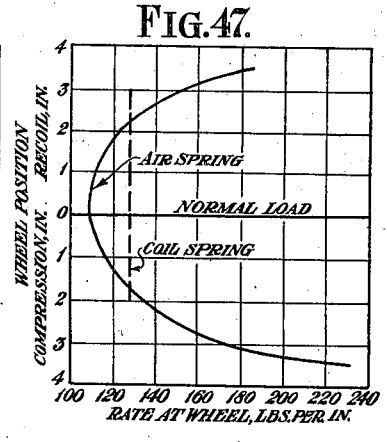
INVENTOR
Roy W. Brown
BY Albert L. Ely
ATTORNEY

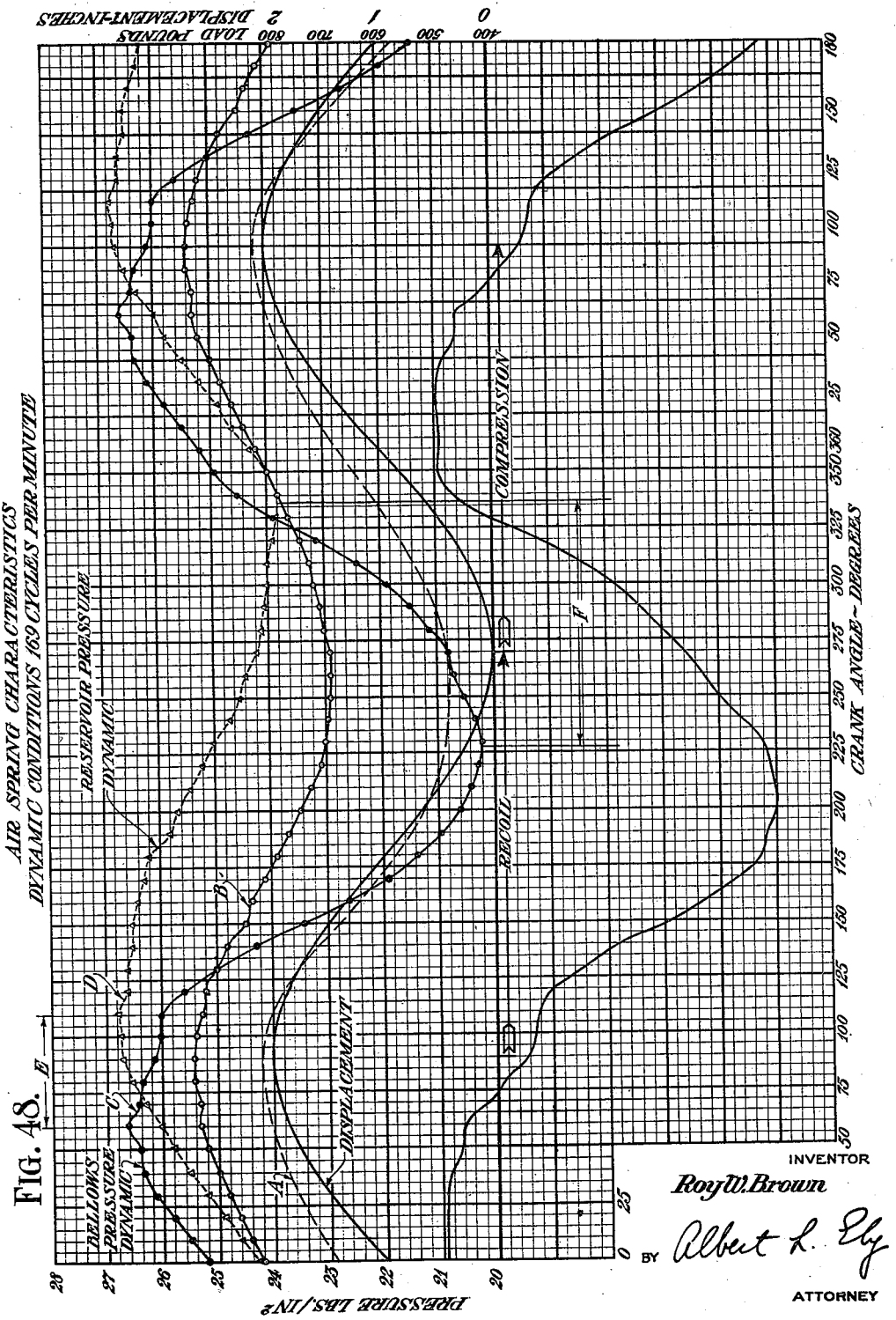

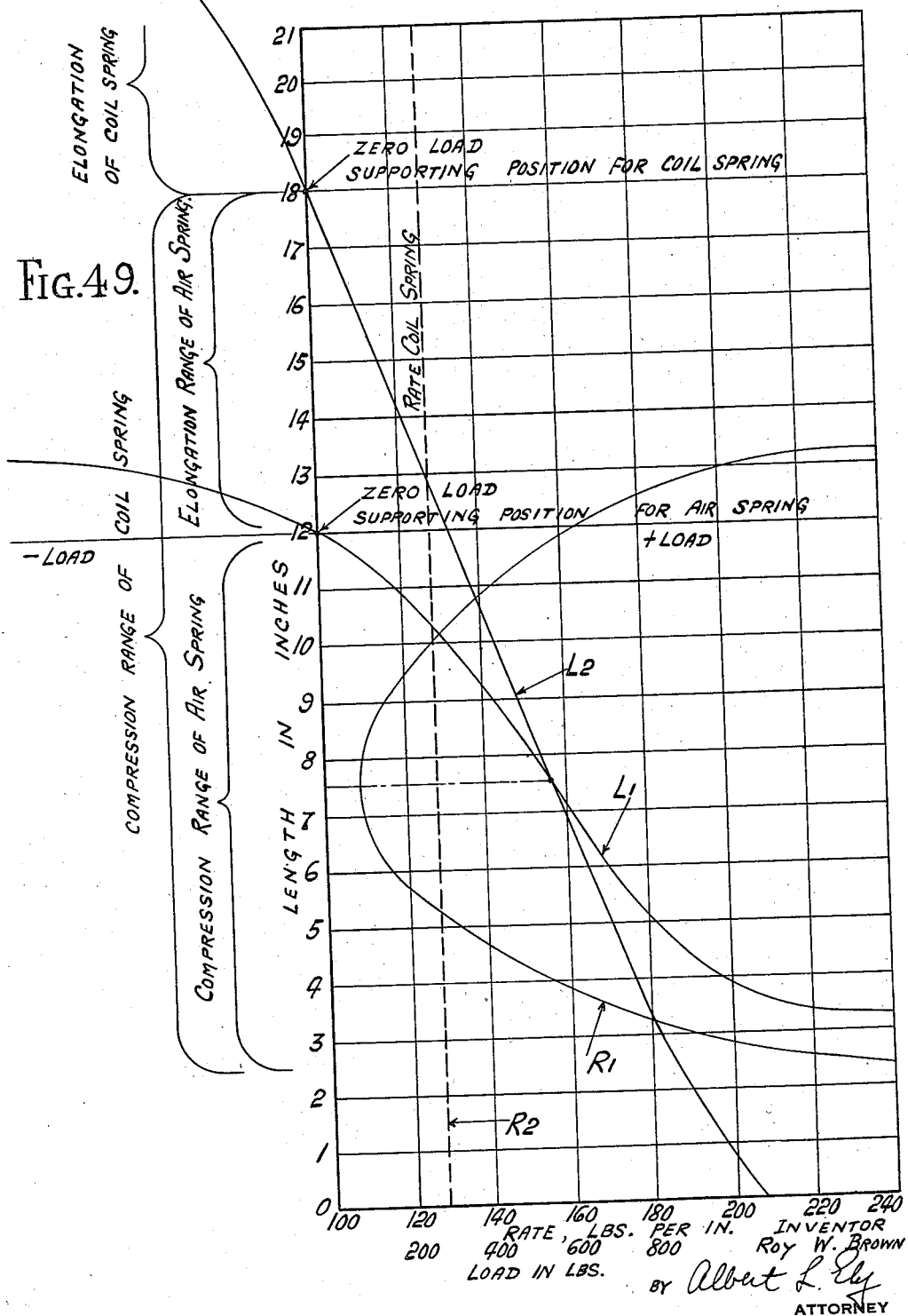

Patented July 16, 1940

2,208,537

UNITED STATES PATENT OFFICE 2,208,537

ART OF VEHICLE SUSPENSION

Roy W. Brown, Akron, Ohio, assignor to The Firestone Tire & Rubber Company, Akron, Ohio, a corporation of Ohio Application September 17, 1937, Serial No. 164,348

31 Claims. (Cl. 267—15)

This invention relates to a resilient force resisting and vibration absorbing supporting device and is particularly concerned with a pneumatic cushioning device adapted to serve as common means for supporting load and damping vibrations between a wheel or running gear and a vehicle body.

More particularly, the invention relates to a new type spring member using air as the load carrying means for realizing extremely low spring rates under normal riding conditions, with attendant comfort to the passenger of the vehicle. The invention further relates to shock absorption, energy storing and anti-body-roll devices incorporated in, and functioning as integral parts of, the vehicle suspension. The novel suspension includes a simple, practical, light weight unit possessing the capability of variation of spring rate with wheel position, approximate aperiodic body damping, reduction of body roll to less than that obtained with high rate springs, wide range of load capacity with substantially constant body frequency, and adjustability of wheel position to the operable point. Further practical characteristics of the novel suspension include the provision of an air spring having extraordinary flexing life as determined by laboratory and road tests.

Safe operation at today's high speeds under the traffic conditions encountered dictates the extensive and complex mechanical conditions that must be fulfilled by any practical suspension, in addition to provision for such characteristics as will result in the greatest comfort and least fatigue for the passenger. For a review of the underlying theories of motor car suspensions, reference is made to the article by James J. Guest, entitled "The Main Vibration of an Autocar," appearing in "Engineering," September 18, 1925, page 367. Results of an extensive study of methods of practical applications of these theories were published by W. S. James, H. E. Churchill and F. E. Ullery in their article entitled "'Sky-Hooks' for Automobiles," published in S. A. E. Transactions, September, 1935, pages 313–321. The effect of weight distribution and other physical suspension characteristics at the time that independent wheel suspensions were introduced to the American market were thoroughly studied and reported on by Maurice Olley, "Independent Wheel Suspension—Its Whys and Wherefores," S. A. E. Transactions, March, 1934, pages 73–81, and by George L. McCain, "Dynamics of the Modern Automobile," S. A. E. Transactions, July, 1934, pages 248–256.

Three major factors may be segregated which concern the passenger, as their combined effect largely determines the extent of his physical and mental discomfort and fatigue resulting from road shocks. These are:

(1) *Spring rate.*—This factor determines the extent of shock transmission to the passenger and of the direct wheel and chassis motions caused by road irregularities.

(2) *Shock absorption.*—Provision is necessary to diminish succeeding motion of the chassis caused by stored energy in the suspension and moving parts after the wheel has passed over the road irregularity.

(3) *Body roll.*—Horizontal forces developed in rounding corners acting at the center of the sprung weight cause an outward angular rotation of the body on the suspension system which becomes greater with lower-rate springs.

The first of these factors can be minimized by using soft springs in the suspension, that is, springs in which a small additional load results in appreciable deflection. The second condition is met by shock-absorber damping devices, the effect of which must be varied for the softer springs. In a number of instances the third condition of body roll in cornering has been minimized by fitting a member between wheels, either front or rear, in such a manner that elastic torsional deformation of the member occurs when movement of either wheel with reference to the body is different than the opposite wheel, which condition occurs with angular motion of the body.

Unfortunately, the inertia and highly viscous drag of the hydraulic shock absorbers extensively used at present result in restriction of wheel movement, the reaction to which is transmitted to the passenger as a series of definite and sharp vibrations. Likewise, torsional members fitted between the wheels very appreciably minimize the advantages of a softer suspension when the motion of the two wheels to which the member is connected is other than equal both in direction and extent, the condition which predominates in actual road service.

A compromise is involved in fitting adequate mechanical and hydraulic shock-absorbing and torsional stabilizing devices which has, in effect, prevented the realization of the comfort possible with soft or low rate springs. Numerous air springs and other mechanical devices as disclosed in thousands of prior patent and literature references have failed in one respect or another to afford the optimum characteristics of a vehicle suspension.

The term "rate" as used herein with respect to spring devices may be defined as the amount of force required to deflect a spring through a unit distance, and is numerically expressed in pounds per inch.

When the spring is assembled with the wheel positioning means in the automobile another important factor is introduced, namely the friction of the suspension. Since the forces to which the passenger is subjected, due to road irregularities, are the result of the combination of the spring rate and the friction, reduction of the latter becomes very important when it is considered that friction approximates spring rate in the lower-rate suspensions now in service. The subject of friction is well summarized by Georges Broulhiet in "Independent Wheel Suspension," S. A. E. Transactions, October, 1933, pages 325–347.

The "boulevard ride" requires extremely low-rate springs. Wheel movement under this condition is small compared to that occurring at higher speeds, or at abusive speeds, over rough roads. The ideal spring rate to meet both of these conditions is one in which the rate increases both on compression and recoil from the normal load position. The elastic deformation of the metal used in conventional springs gives substantially equal rate at all loads. Numerous mechanical devices have been devised to compensate for this characteristic of metal springs. They have failed to come into use apparently because the many loaded joints necessary, result in a large friction effect and a high cost due to their comparatively complicated mechanisms.

The air spring embodying the present invention has been designed so as to approximate the ideal rate condition necessary for the "boulevard ride" and also to provide the increase in rate desirable to prevent bottoming, reduce body-roll, and prevent excessive recoil when driving at high speeds or over rough roads.

The air spring of the present invention includes a low-rate air-inflated bellows with self-contained shock-absorbing and anti-body-rolling properties. The bellows is connected to a reservoir and suitable flow control means is interposed in the air connection between the bellows and the reservoir. The size of the reservoir used with each air spring determines the static rate characteristics, and a suitable reservoir may be selected to meet the requirements of the vehicle upon which it is to be applied.

The air spring has an inherent advantage in that its dynamic rate characteristic can be varied as distinguished from other prior art suspensions, by restricting the passage between the bellows and the reservoir. This adjustment can also be made by means of inertia, velocity, or remote manually operated valves if desired, to adapt the suspension to the best possible riding comfort condition. The present invention permits the storing of energy as the wheel of the vehicle passes over a road irregularity and utilizes such energy to dampen the recoil movement of the wheel and body.

Damping on the compression stroke (wheel moving upward) while the body is moving upward tends to aggravate the movement. Later in the body-movement cycle when the body is moving downward, compression damping tends to decrease the downward body motion. The first effect is undesirable, but the second is desirable. Damping on the recoil stroke (wheel moving downward) when the body is moving upward tends to minimize the body motion, while damping tends to increase the body motion when the body movement on this stroke is downward. In this case, the first effect is desirable, and the second is undesirable. When employed on front-wheel springing, damping during the recoil stroke has a further disadvantage in that, when a wheel leaves the road, it interferes somewhat with steering by increasing the length of time the wheel remains out of contact with the road surface. The damping problem is further complicated by the inability thus far to apply adequate damping devices independently to the comparatively high-frequency tire oscillations.

Adequate damping devices, as previously pointed out, must be free from friction, inertia, and highly viscous drag and, preferably, operating characteristics should not change with temperature variations. The work cycle of an adequate damping device approaches that of the spring itself, indicating another advantage for a spring construction with inherent damping properties.

Experience has proved that the energy available for damping is more than sufficient to realize perfect aperiodic damping of the body without measurable interference with steering. Such damping is appreciably more than has been generally used, on account of the interferences which have formerly resulted with the boulevard ride and wheel action at high speeds. In fact, the additional damping secured by this method appears to have improved the rear-seat ride through minimizing pitching by an amount appreciably greater than could have been anticipated from the simultaneous reduction of front-end spring rate.

The physical and mental reactions of the passenger are determined not only by the amount of body movements, but also by their frequency, or the number of times per minute succeeding movements occur. The body of a motor car constitutes a mass suspended on a spring, which system has a natural frequency depending upon the body weight and the amount this weight deflects the springs.

Each year the vehicle body frequency considered most comfortable has been lowered. Some years ago, when the body frequencies resulting from the suspensions then used were in the neighborhood of 140 cycles per minute, a frequency of 126 was thought to be ideal. At present some of the lower rate suspensions result in body frequencies of from 90 to 110 cycles per minute, while 60 to 80 cycles per minute is considered ideal. With the true aperiodic damping afforded by the use of the present invention, there is no succeeding cycle. Hence there is no frequency, as the displacement from road irregularity or other cause is limited to one cycle.

Such aperiodic damping also eliminates the exciting of resonant vibrations in other parts of the vehicle. This advantage is of particular importance in the event that it is desirable to use front and rear springs under loading conditions which would result in equal natural frequencies if conventional springing were employed.

The smooth damping action available from air flowing through a closed system can be augmented if desired both on compression and recoil, as previously stated, by adjustments employing inertia, velocity, or manually operated valves. Proportioning of the reservoir and attention to valve design can be employed to damp wheel motion to the maximum extent permitted by steering and body-ride interference. The comparative simplicity of the parts involved permits quick and inexpensive adaptation to provide the most desired results, for the individual suspension under consideration.

When a car passes around a curve, centrifugal force acting at its center of gravity tends to displace the body along a line extending radially outward from the center of the curve. Since the tires restrict lateral displacement, rotation of the body takes place dependent in degree upon the characteristics of the suspension. This phenomenon has been the subject of much study and has been briefly summarized by P. M. Heldt in his article, "Car Sway with Different-Type Front-End Suspensions," "Automotive Industries," July 21, 1934, pages 84-86. If spring rates are reduced to provide a soft ride, angular rotation of the body in cornering becomes so objectionable as to limit definitely further reduction in spring rate. This condition has been minimized in some conventional suspensions by installing a torsional member between either front or rear wheels, or both. Unfortunately, such a torsional member definitely increases the effective spring rate, except when the action of both wheels is equal in direction and amount, a condition seldom encountered on the average road.

The air spring embodied in the present invention affords a practical solution to the cornering problem through the increasing rate characteristic of the bellows, and through the use of suitable flow control means between the bellows and reservoir. In one form of the invention the latter comprises a pendulum control valve whereby the passage to the reservoir is closed or restricted due to the action of centrifugal force upon a pendulum which permits a check valve to close the passage to the reservoir. In other forms of the invention other flow restricting means are employed to afford similar results. When the vehicle is driven around curves at high speeds the rapid increase in pressure in the bellows resulting from the inclination of the body developed in turning, prevents the body from inclining to the outside an undesirable amount.

The pendulum control valve or flow control means may also be utilized for preventing nosing down of the front portion of the car upon quick brake application. The ability of the present invention to reduce body roll is enhanced by the characteristic of the air spring whereby it can be laterally positioned further from the center line of the car and higher with respect to the center of gravity than in the prior art types of suspensions. The effectiveness of this feature is apparent when it is considered that the stability of the body of the vehicle is increased in proportion to the cube of the distance of the spring from the central longitudinal plane of the vehicle and varies inversely with the sine of the angle formed between a line passing from the top of the spring to the center of gravity and the horizontal plane passing through the center of gravity. Because the air spring bellows is capable of comparatively large travel with relatively small over-all length and still retains very low rates near the middle point of travel, the unit can be applied in such locations as to carry the load directly, or with the minimum amount of intervening linkage.

With a suspension having a higher rate over the initial part of its travel when compressed from a free or zero load position than over the intermediate range of travel, less total compression of the suspension is necessary to attain a determinate load supporting resistance without sacrificing the advantages of a "soft" suspension. In other words, with a suspension having a constant rate over the range of compression between its zero position and the normal load supporting position, the suspension must be compressed a very great amount before the stress or force built up in the suspension is great enough to support the normal vehicle load. It also necessarily follows that a suspension with a constant low rate throughout its range of travel, must elongate very greatly before it passes through zero load supporting position and provides tension resistance, whereas with the air spring having a variable rate this latter advantageous characteristic may be attained within practical limits.

The major object of this invention therefore is to provide an improved resilient device which serves a common purpose of supporting the load and damping compression and rebound shocks.

A further object is to provide for the absorption of shock resulting from road irregularities in a vehicle and the damping, suppressing and counteracting of vehicle body movement resulting from said road irregularities.

Another object is to provide an improved resilient load-supporting device adapted to be connected between the running gear or wheels and the body of the vehicle which device has very low internal friction of substantially constant value.

Another object is to provide a resilient load-supporting device adapted to dissipate and store the energy of road-shock-producing movement of the wheel relative to the body, and to utilize such energy to suppress sustained oscillation of the wheel or running gear with respect to the body.

Another object is to provide a resilient vehicle load supporting device having a different rate under dynamic conditions from that under static conditions.

Another object is to provide an improved resilient vehicle load supporting device in which the rate increases with acceleration of the relative movement between the running gear or wheel and the body.

Another object is to provide a vehicle spring having a higher rate over the initial part of its travel upon compression from a free or zero load position than over the intermediate range of travel, so that a lesser total compression is necessary to attain a determinate compression load supporting resistance without sacrificing the advantages of a "soft" suspension and to provide such a suspension in which the zero compression load supporting position is reached and tension resistance is attained upon a minimum of elongation from the determinate compression load supporting position.

Another object is to devise a construction wherein pneumatic suspension units are so located between the body and the wheels that the body will have maximum stability under operating conditions, especially effectively to oppose forces resulting from horizontal accelerations, and particularly when rounding curves and when accelerating or decelerating.

Another object is to provide a resilient vehicle load supporting device in which the rate increases during movement of the wheel toward the body without proportionately increasing the energy which later would result in rebound of the body.

Another object of the invention is to provide a resilient load supporting device having a comparatively low rate over a considerable range on either side of the normal load supporting position while having an appreciable increase of rate when the supporting device is deviated substantially from the normal load supporting position.

Another object of the invention is to provide a resilient suspension for a vehicle in which the aperiodic damping factor is such as substantially to eliminate the effect of the fundamental frequency of the vibratory system of the suspended vehicle body.

Another object is to provide an improved vehicle load supporting device which will prevent excessive rebound of the body or frame and will at the same time minimize the tendency of the wheels to bounce off the ground.

Another object is to provide a unitary vehicle suspension having a rate characteristic on the rebound movement different from that on the compression movement.

Another object is to provide a vehicle suspension means normally having a low rate at the normal position of the vehicle body with respect to a vertical plane, and having means for increasing the rate in opposition to forces tending to cause angular displacement of the vehicle body, such as body roll.

Another object is to provide a pneumatic vehicle suspension means in which undesirable damping action is minimized on the compression stroke (wheel moving upward) while the body is moving upward; in which adequate compression damping is provided later in the body-movement cycle when the body is moving downward; adequate damping is provided during the recoil stroke (wheel moving downward) while the body is moving upward; and damping is minimized on the recoil stroke while body movement is downward.

A further object is to devise a pneumatic vehicle suspension and road shock damping system including a pneumatic cushion and reservoir, in which a valve interposed between the cushion and reservoir is so constructed as to cause energy to be stored in the reservoir as the vehicle wheel is displaced in an upward direction with respect to the body, to release a portion of said energy during the rebound movement of the wheel, and to release the remainder of said stored energy during the first portion of the succeeding upward displacement of the wheel in such a manner that the energy of the compressed air within the pneumatic cushion exerts a force on the ends of the cushion which is out of time-phase with respect to the relative movement between the body and the wheel.

Another object is to devise a pneumatic suspension device comprising a bellows and supporting means therefor, wherein the shapes of supporting means and the bellows are such that as the bellows progressively contacts different areas of said supporting means during deflection of the bellows, the effective area ("piston effect") of the latter will be changed to afford optimum riding qualities, the shape and size of the supporting means being capable of change to meet the individual requirements of load, rate and change of rate of different automobiles or of different riding qualities on the same automobile, without changing the bellows design and construction.

A further object is to devise an improved inertia-controlled valve for use with pneumatic suspension devices on motor vehicles, such as devices which comprise a resilient, pneumatic bellows that replaces one of the springs of the vehicle, a reservoir for air under pressure, and a valve that controls the flow of air between the bellows and the reservoir.

Additional objects of the invention are to provide pneumatic suspensions of the character mentioned with improved inertia-controlled pendulum valves responsive to accelerations in a horizontal plane; to provide a pendulum valve having a pendulum mounted for universal movement yet effecting a valving action when moved in a determinate direction or directions; to provide a valve, that functions normally as a single-acting check valve, with inertia-controlled means for converting same into a double-acting check valve under abnormal conditions; to provide improved check valve construction; to provide improved inertia-controlled valve mechanism responsive to accelerations in a vertical plane; and to provide long life and quietness of operation in valves of the character mentioned. A further object is to provide, in combination with a check valve, a pressure-controlled valve adapted to regulate the difference in pressures in the reservoir and bellows to a determinate maximum. Another object is to provide an inertia-controlled valve structure to retard the flow of air from the bellows when the latter is compressed while the valve is subjected to a high downward acceleration, thereby reducing bottoming as when the wheel of the vehicle drops into a rut in a roadway. Another object is to devise a valve construction in which the valve orifices are so shaped as to reduce the formation of eddy currents as the air passes through the valve from the pneumatic cushion to the reservoir. Another object is to provide a valve structure in a pneumatic suspension of such characteristics that it will permit substantial transfer of air from the bellows to the reservoir and back again in the short time intervals incident to the oscillation of the wheel structure.

A further object is to devise a novel air spring construction in which a pneumatic cushion member is provided with an end plate and clamping means for attaching the cushion member to the end plate in an air-tight manner.

A further object is to devise an improved end plate for co-operation with a pneumatic cushion, which end plate, while light in weight, has increased structural strength and rigidity, and is so shaped as to eliminate dead air spaces within the pneumatic cushion member.

Other objects will be manifest as the specification proceeds.

Of the accompanying drawings:

Figure 4 is a section, on a larger scale, taken on the line 4—4 of Figure 3 and showing in detail one embodiment of a portion of the suspension mechanism;

Figure 5 is a section taken on the line 5—5 of Figure 4 showing one form of inertia controlled valve, on a larger scale;

Figure 5a is a section taken on the line 5a—5a of Figure 5;

Figure 6 is vertical sectional view of another embodiment of the improved valve;

Figure 7 is a vertical section through another embodiment of the pneumatic suspension device embodying the invention;

Figure 8 is a vertical section through yet another embodiment of the suspension embodying the invention;

Figure 9 is a section taken on the line 9—9 of Figure 8;

Figure 10 is a vertical sectional view of an inertia controlled valve constituting another embodiment of the invention;

Figure 11 is a section taken on the line 11—11 of Figure 10;

Figure 12 is a section taken on the line 12—12 of Figure 10;

Figure 13 is a fragmentary vertical sectional view of yet another embodiment of the improved valve construction;

Figure 14 is a fragmentary vertical sectional view of still another embodiment of the improved valve;

Figure 15 is a section taken on the line 15—15 of Figure 14;

Figure 16 is a vertical sectional view of another embodiment of the improved valve adapted to be mounted interiorly of the compressed air reservoir;

Figure 17 is a vertical sectional view of another embodiment of the invention, including a pendulum controlled valve in addition to a valve that is inertia-controlled;

Figure 18 is a section taken on the line 18—18 of Figure 17;

Figure 19 is a section taken on the line 19—19 of Figure 17;

Figure 20 is a vertical sectional view of another embodiment of the improved valve including the feature of inertia (pendulum) control but without the check-valve feature;

Figure 21 is a vertical sectional view of another embodiment of the improved valve structure, including a supplemental relief valve that opens automatically when the differential pressure in the bellows and reservoir exceeds a determinate maximum;

Figure 22 is a fragmentary elevation of the structure shown in Figure 21;

Figure 23 is a section on the line 23—23 of Figure 22;

Figure 24 is a section on the line 24—24 of Figure 21;

Figure 25 is a section on the line 25—25 of Figure 26;

Figure 26 is a fragmentary vertical section through a pendulum valve structure including a modified pressure operated supplemental relief valve, as taken on the line 26—26 of Figure 25;

Figure 27 is a fragmentary vertical section through a pendulum valve structure including still another modified pressure operated supplemental relief valve;

Figure 28 is a fragmentary vertical section through a check valve comprising a rubber valve disc;

Figure 29 is a section on the line 29—29 of Figure 28;

Figure 30 is a vertical section through another embodiment of the invention wherein two valve discs are employed;

Figure 31 is a section on the line 31—31 of Figure 30;

Figure 32 is a vertical section through another embodiment of the invention employing two valve discs, one of which is a pressure operated relief valve;

Figure 33 is a section on the line 33—33 of Figure 32;

Figure 34 is a section on the line 34—34 of Figure 32;

Figure 35 is a fragmentary vertical section through another further improved embodiment of the invention;

Figure 36 is an enlarged section on the line 36—36 of Figure 35;

Figure 37 is an enlarged section on the line 37—37 of Figure 35;

Figure 38 is an enlarged bottom view of the valve structure illustrated in Figure 35;

Figure 39 is a fragmentary vertical section of the lower portion of a modified valve structure similar to that illustrated in Figure 35;

Figure 40 is a fragmentary vertical section through another modified form of a suspension device embodying the invention;

Figure 44 is a graph indicating the concurrent oscillation of the wheels and body with respect to the ground in a drop test on an automobile with an ordinary metal spring suspension and hydraulic shock absorber;

Figure 45 is a graph indicating the concurrent oscillation of the wheels and body with respect to the ground in a drop test on the same automobile with an air spring suspension embodying the present invention;

Figure 46 is a graph showing a family of curves representing the static rates of the suspension with reservoirs of different capacities;

Figure 47 is a graph showing curves representing the static rates of a coil spring suspension and an air spring suspension and an air spring suspension embodying the present invention.

Figure 48 is a chart of curves representing the relative dynamic and static characteristics of the novel pneumatic suspension.

Figure 49 shows the relation between the rate and load (stress-strain) curves, respectively, of a conventional coil type steel spring and a pneumatic suspension of the present invention.

Figure 1:
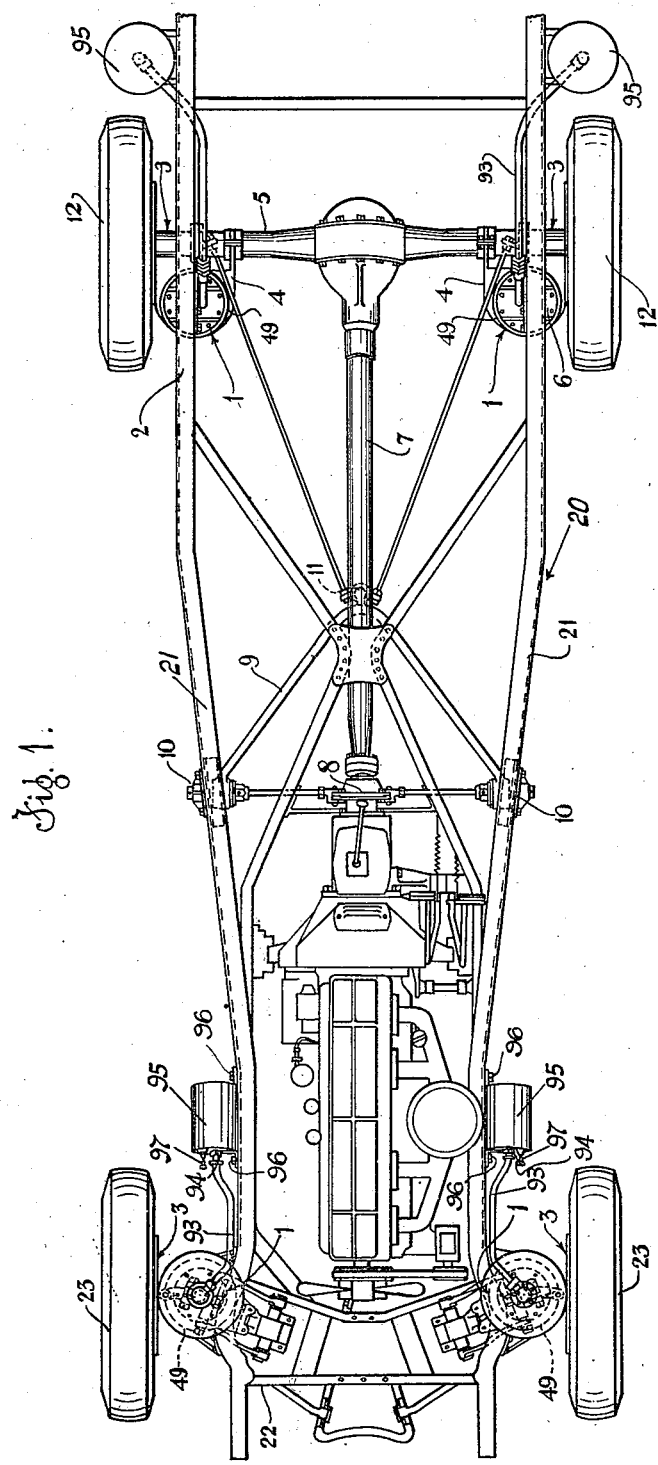
Figure 1 is plan view of a vehicle chassis assembly illustrating an application of an embodiment of the invention.

The illustrative embodiments of the invention shown in the drawings consist of a pneumatic suspension device applied to a motor vehicle, and replacing the standard type of leaf spring or coil spring usually used for supporting the chassis of the vehicle. It will be understood, however, that the invention is not limited to this particular type of installation, but may be used in many other applications such as airplane landing gears, truck and bus suspensions, railway cars, and other situations where elastic load-carrying mechanisms are employed.

Referring to the drawings, Figure 1 is a plan assembly illustrating the chassis of a motor vehicle and showing the general arrangement of pneumatic suspensions in accordance with the present invention, employed on the front and rear wheels of the vehicle, although it will be understood the novel pneumatic suspensions may be used either on the front or rear wheels alone.

The suspensions indicated generally as 1 are so mounted between the frame 2 and the running gear 3 as to support the load of the vehicle resiliently on the wheels. At the rear end of the vehicle the suspensions are carried in part by suitable brackets 4 on the rear axle housing 5 and brackets 6 on the frame. The rear axle housing 5 is also connected to the frame through torque tube 7 and universal joint 8. The rear suspension also comprises a suitable stabilizer such as V-shaped member 9 pivotally connected at the sides of the frame 2 at joints 10 and pivoted to torque tube 7 through a universal joint 11 below the torque tube. It will be understood that other types of rear end stabilizers may be employed. The rear wheels 12 are mounted on rear axle housing 5 in the usual manner.

Figure 2:
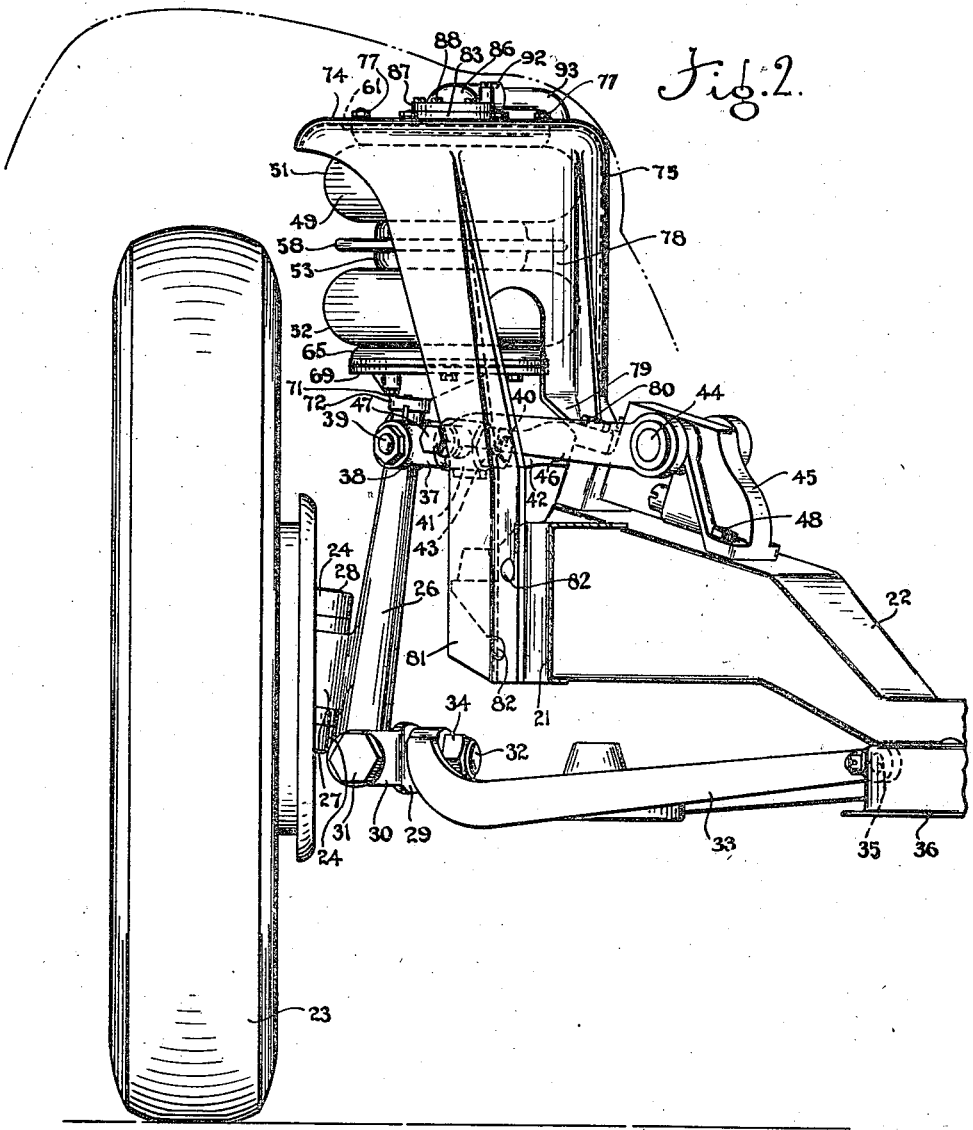
Figure 2 is a fragmentary front elevation of a motor vehicle equipped with a pneumatic suspension device embodying the invention.
Figure 3:
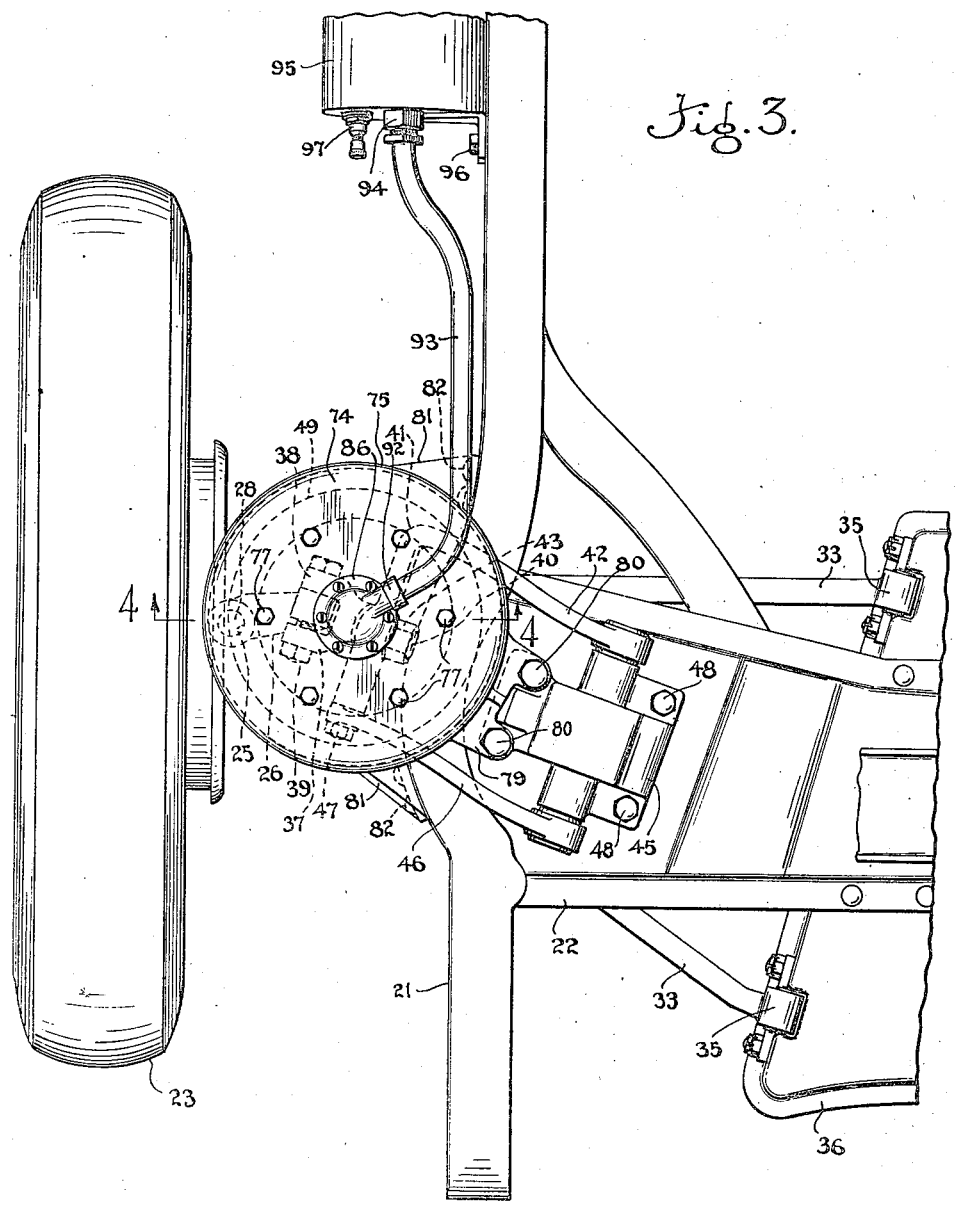
Figure 3 is a plan view of the structure shown in Figure 2.

At the front of the chassis the longitudinally extending side channel members 21 of frame 2 are spaced apart and rigidly connected by a front cross member 22, as illustrated in Figures 1, 2 and 3 of the drawings. Front wheels 23 are journaled upon the usual spindle, the inner end portion of which is forked at 24 and formed with axially aligned apertures 25. In the embodiment illustrated, the wheel 23 is connected to the chassis 20 by the conventional parallelogram linkage comprising an upright member 26 having an integral tubular extension 27 swivelled between the forked ends 24 of the axle spindle upon a pin or bolt 28 in the apertures 25 of said spindle. A member 29 has forked ends 30 that straddle the lower end portion of upright member 26 and are pivotally connected thereto by a bolt 31. The member 29 also is provided with a screw-threaded stud 32 extending in the opposite direction to its forked ends 30, which stud projects through an aperture provided at the apex of a pair of angularly extending links 33, and is secured to the latter by a nut 34. The inner ends of the links 33 are pivotally connected at 35 with adjacent portions of a sub-structure 36 that in turn is connected to the cross member 22, as is most clearly shown in Figure 3 of the drawings.

A member 37, similar to member 29 and provided with forked ends 38, engages the upper end of upright member 26, being pivotally connected thereto by a bolt 39. The member 37 also is provided with a screw-threaded stud 40 extending in the opposite direction to its forked ends 38, which stud projects through a suitable bore formed in a lateral extension 41 on a link 42 and is secured to the latter by a nut 43. The inner end of link 42 is pinned or otherwise secured to one end of a short shaft 44 that is journaled in a bearing bracket 45, the latter being secured to the top face of cross member 22 by bolts 48, 48. A link 46 has one end pinned or otherwise secured to the other end of shaft 44, and has its opposite end secured to the end of the lateral extension 41 by a bolt 47. By the arrangement of parallel linkages shown, the wheel 23, while held in proper position, is movable independently with relation to the chassis as well as with relation to the other front wheel of the vehicle, which is similarly mounted. The front end construction described in the foregoing portion of the specification is standard on some types of vehicles at the present time, except that heretofore such vehicles have required hydraulic shock absorbers. Hence the structure described of itself forms no part of the present invention except as it may be included in combination with a pneumatic suspension device subsequently to be described.

The pneumatic system is substantially identical for both the front and rear suspensions as indicated in Figure 1, but will be described in detail as applied to the front wheel suspension. In Figure 4 a detail sectional view of one embodiment of the said pneumatic suspension device is shown wherein a bellows 49 is provided, which bellows is substantially circular in plan as is more clearly indicated in Figure 3. The bellows 49 is made of rubber reinforced with cotton cords 13, two plies of the latter being shown for illustrative purpose only, said cords being vulcanized within the rubber to provide a composite structure of great strength. The bellows has an integral inner facing or lining 14 of rubber composition, similar to that employed for tire inner tubes, to prevent any leakage of air through the bellows.

The bellows 49 is of generally tubular form, and has a constricted portion 50 of considerable extent in its medial region, thus providing two expansible and contractible portions 51 and 52 of which the former is above the constricted region and the latter below it. A girdle ring 53 encircles the outer periphery of the constricted region 50 to prevent radial expansion thereof. The ring 53 comprises cooperating semi-circular sections, preferably steel stampings, having when assembled a cylindrical inner wall 54 co-extensive with the constricted portion 50 of the bellows. The opposite lateral margins 55 of the ring are rounded radially outwardly and thence in a reverse curve 56 that brings them into radially outwardly extending, face to face relation to define a two-ply flange 57 formed with a peripheral bead 58, the flange and bead being disposed midway between portions 51, 52 of the bellows. The rounded margins 55 of the ring are so positioned as to be engageable by the respective adjacent portions of the bellows, and are so shaped as to prevent sharp flexure of the latter during compression or expansion thereof.

The opposite ends of the bellows 49 have axially extending, circular, flange portions 59, 59 terminating in laterally extending peripheral beads 60, 60 somewhat similar to the beads of pneumatic tire casings. Bead-clamping rings 61, preferably of rust-proof stamped steel, have flat portions 62 provided with a plurality of bolt holes for receiving attaching bolts 63, and have their inner peripheral portions formed with respective hook portions 64 that are engageable over the beads 60. Respective rings 65 that are U-shaped in section are positioned over the bead-clamping rings 61, said rings having their outer marginal portions in engagement with peripheral flanges 66 at the outer periphery of the respective rings 61, and having their inner margins rested upon flanges 67 formed on hook portions 64 of said rings 61.

The rounded portions of the rings 65 are arranged for contact with the adjacent portions of the bellows, and prevent sharp flexing of the latter adjacent the beads thereof, during compression or expansion. The end faces of the bellows, on each flange portion 59, may be formed with low, concentric ribs 59', 59' to assist in forming a fluid-tight seal between the bellows and the structures connected to the respective ends thereof.

The lower end of the bellows has a plate 68 extending thereacross for closing the same, said plate being formed with bolt holes through which bolts 63 extend. Also mounted upon the lower end of the bellows is an end casting 69 that is formed with bolt holes to receive bolts 63, the latter having lock washers 70 and nuts 71 thereon, the arrangement being such as to clamp the bellows bead firmly in place between a bead clamping ring 61 and the end casting 69. The latter has an offset portion 72 provided with an aperture to receive the threaded upper end portion of the upright member 26, a nut 73 being provided for retaining said members in assembled relation.

At its upper end the bellows 49 is connected by bolts 63, 63 to the overhanging upper portion 74 of a housing 75. Lock washers 76 and nuts 77 likewise secure the upper bead clamping ring 61 in place to retain the bead 60 against displacement. The housing 75 has a downwardly extending, transversely arcuate portion 78 that partly encircles the bellows 49, and adjacent its mid portion the lower end of the housing is flared outwardly at 79, Figure 2, said flared portion being rigidly secured to the bearing bracket 45 by a plurality of cap screws 80. The respective lateral portions of the depending portion 78 of housing 75 are provided with respective extensions 81 that are secured to the chassis 20 by bolts or rivets 82. The relative position of a fender is shown in broken lines in Figure 2.

The overhanging portion 74 of the housing 75 is formed with a bore that is in axial alignment with the axis of the bellows 49, said bore being circumscribed by a concentric flange 83 that is formed on the top side of said overhanging portion, the flange being slightly spaced from the bore to provide an annular seat 84 therebetween. Mounted upon the seat 84 and flange 83 is a tubular valve casing 85, the lower portion of which extends through the bore in the housing portion 74 and projects into the interior of the bellows 49. Said valve casing is in two parts, the upper part or cover, designated 86, being disposed above the housing portion 74 and being threaded onto the lower portion of the casing. The casing cover 86 is formed with a circumferential flange 87 that rests upon the flange 83 and is secured thereto by bolts 88. That portion of the cover 86 that fits within flange 83 is designated 89, and there is a sealing gasket or washer 90 of rubber positioned between said cover portion 89 and the seat 84.

The valve cover 86 comprises a dome-like portion 91 that is formed with a tubular projection 92 within which one end of a tube or pipe 93 is mounted. The other end of the pipe 93 is attached to an outlet connection 94 on a reservoir 95 that is secured by bolts 96 to the side of a frame member 21, as shown in Figure 3, or at any other suitable location on the vehicle. The reservoir 95 is of any suitable size and capacity, and is provided with a valved filling port 97 through which fluid, such as air, may be introduced into the reservoir. The reservoir 95 is in communication with the interior of the bellows 49 through the agency of the pipe 93, with the result that the bellows is inflated to determine static pressure, the pressure employed depending upon the load required to be supported.

The valve mechanism employed in valve casing 85 in general is of the oscillating or pendulum type of which several different constructions may be advantageously employed, that shown in Figures 4, 5 and 5a being first described herein. As shown in said figures, the bottom of valve casing 85 is provided with a removable cap 98 that is secured thereto by bolts 99. The cap has a central opening 100, and complemental grooves or recesses are provided in the adjacent faces of the cap and casing to constitute a concentric chamber 101 about the opening 100 and open to the latter. The arrangement is such as to provide an upper valve seat 102 on the casing and a lower valve seat 103 on the cap, said valve seats being spaced apart from each other in parallel planes. A light weight, hardened steel, disc valve 104 is positioned between the valve seats 102, 103 and is adapted freely to move into engagement with either so as to interrupt free communication between the bellows 49 and the reservoir 95 in a manner presently to be explained. One or more small openings 105 are formed in the cap 98, which openings extend from the chamber 101 to the exterior of the cap for the purpose of by-passing a small quantity of air around the disc valve 104 when the latter is resting upon the lower valve seat 103. The valve 104 is formed with a concentric, upwardly projecting medial region 104' of definite size.

A valve control member consisting of a gravity pendulum 106 is mounted within the valve casing 85. Said pendulum comprises a bob 107, which bob is a lead body of approximately frustoconical shape with its smaller end lowermost. The bob 107 is in axial alignment with the valve seats 102, 103, as shown in Figure 4, when the vehicle is stationary and in horizontal position, and is of such size as to be spaced from the inner wall of the casing under the same conditions. The bob 107 is formed with an axial bore through which extends the lower end portion of the pendulum, the latter consisting of a metal rod 108.

A generally cup-shaped rubber member 109 having a tubular metal sleeve 110 molded axially therein is mounted upon the lower end portion of the pendulum in such a manner as to embrace a portion of the lower end of the bob 107, said bob and cup shaped member being retained on the pendulum by a nut 111 threaded onto the lower end of the latter. There is an extension 112 on the lower end of the pendulum adapted to engage the raised portion 104' of the disc valve 104, to prevent said valve disc from seating upon the upper valve seat 102 when the axis of the pendulum is normal to the plane of the said disc.

The upper end of the pendulum rod 108 is formed with a spherical ball or knob 113 that is mounted within a tubular socket 114 that projects downwardly from the dome of the casing cover 86, at the axis thereof. The socket 114 is formed with female screw threads to receive an exteriorly threaded, split retaining plug 115, the latter being formed with a flared axial orifice therethrough to accommodate the pendulum rod 108. The plug 115 adjustably retains the ball or knob 113 in its socket, and permits free and easy oscillatory movement of the bob 107 about the ball as an axis of suspension. During oscillation of the pendulum the marginal portion of the rubber member 107 about the bob serves as a bumper with the result that the metal bob cannot strike against the inner wall of the casing 85, and noise from this source is obviated. An extreme angular position of the pendulum is shown in broken lines in Figure 5. Oscillatory movement of the pendulum in one direction is prevented by a pin 117 that extends, in the manner of a chord, across the interior of the casing 85 and has its ends secured in the wall thereof, as is most clearly shown in Figure 5a.

In the operation of the embodiment of the invention hereinbefore described, it will be assumed that the desired air pressure has been established in the reservoir 95. Assuming also that the vehicle is stationary and resting on a horizontal plane, the same air pressure will be present in the bellows 49 for the reason that the pendulum 106 will be in vertical position and there will be free communication between the reservoir and bellows through the by-pass openings 105 of the casing-cap 98. The air pressure thus established in the bellows should be sufficient to support the static weight of the vehicle body with the bellows compressed to the proper height. The normal overall height (length) of the bellows under normal load should be about an average between the maximum and minimum longitudinal dimensions that obtain under conditions of expansion and compression. The bellows and adjacent movable elements will then assume approximately the shape and positions shown in full lines in Figure 4.

For the purpose of illustration, an example of the sizes, values, and characteristics of a pneumatic suspension may be stated here. Assuming that the suspension is supporting a load of 800 pounds per wheel, the bellows is constructed to have a diameter or width of approximately 8 inches and when inflated to 28.8 pounds per square inch will have a normal length of 7½ inches when so loaded. Figure 4 indicates in dotted lines compressed and extended positions of the bellows. The fully compressed length of the bellows given in this example is approximately 3½ inches, and the fully extended length at zero load is approximately 11½ inches. By placing a tension load on the bellows member it can be extended further, as in the case where the vehicle is lifted considerably off the ground and the weight of the running gear is suspended by the bellows, placing the latter under tension.

As distinguished from the metal spring suspensions of the prior art, the air spring has been designed so as to approximate the ideal rate condition necessary for the boulevard ride and also to provide the increase in rate desirable to prevent "bottoming" and excessive recoil when driving at high speeds or over rough roads. By "bottoming" is meant the maximum compression of the bellows permitted by the mechanical connections between the wheel and frame.

The relationship between the rate and the stress-strain curves of the air spring and coil spring are illustrated in Figure 49, in which curve $L_1$ is the stress-strain curve of the air spring and represents the load for any given deflection, and $L_2$ is the corresponding stress-strain curve for a coil spring. The length of both springs is represented by the same ordinates, and the load is represented by the same abscissae. It will be seen that the air spring passes through its zero load supporting position at 12 inches while the coil spring passes through its zero load supporting position at 18 inches. The portion of the curves to the left of the zero load abscissa indicates the springs under tension, and to the right indicates the springs under compression. These curves have the same value at the normal load supporting length, 7½ inches. The rate of the air spring represented by the curve $R_1$ increases as it is compressed or elongated from its normal load carrying length, whereas the rate of the coil spring, represented by the curve $R_2$, being constant, is a vertical straight line.

The uniform rate of the coil spring is about 128 pounds per inch, whereas the air spring having a value of 109 pounds per inch under normal load conditions, increases slightly in rate at small deflections from the normal position and increases very greatly in rate when deflected greater amounts. The rate of the air spring increases to approximately 230 pounds per inch at 3½ inches compression from the normal load position and increases to approximately 186 pounds per inch when elongated 3½ inches from the normal load position. The coil spring, in order to have a sufficiently low rate for riding comfort and yet have the proper load carrying capacity, must be of much greater length when at zero load carrying position than the air spring. Under practical conditions, taking stability into consideration, the coil spring cannot be made sufficiently long to afford as low a rate at the normal load position as that of the air spring. The length of the coil spring necessitates that it be always under considerable deflection. The present air spring, on the other hand, can be made short enough for stability and, as pointed out above, can actually pass through its zero load carrying position within its operation limits of travel, going to a tension condition to afford an additional snubbing action upon maximum extension. In the air spring this is accomplished within a degree of extension much less than the length of the coil spring at zero load.

Design of the bellows can be varied to provide higher or lower rates as desired. The size of the reservoir used with each air spring determines the static rate characteristics. From the family of rate curves illustrated graphically in Figure 46, the particular reservoir size which best meets the requirements of a car upon which it is to be applied, may be selected.

By taking advantage of the progressively increasing rate set up by increased compression of the bellows, as shown in Figure 47, the tendency to "bottom" while passing over large road irregularities is reduced while extremely "soft" riding over the smaller road irregularities is retained. In the suspension shown in Figure 4, this result is obtained by making the diameter of the constricted medial portion 50 of the bellows slightly less than the diameter of the beads 60, and by the provision of the rounded members 65 on the bead rings and rounded portions 55 on the girdle ring 53, which portions progressively engage adjacent portions of the bellows upon compression of the latter, with the result that the rate increases on compression of the bellows from the condition thereof under normal load. The rate is increased to an even greater degree, to prevent "bottoming" by the provision, on the girdle ring 53, of the radial circumferential flange comprising the grooved flange 57 and peripheral bead 58 positioned so as to be engaged by the adjacent portions of the bellows upon excessive compression thereof such as is shown in broken lines in the upper portion of Figure 4.

When the bellows 49 is compressed under ordinary operating conditions, the pendulum 106 is substantially perpendicular to the disc valve 104, as shown in Figures 4 and 5, with the result that when the disc valve is lifted off of valve seat 103 by the increased pressure in the bellows, it is prevented from rising into engagement with upper valve seat 102, and communication between the bellows and the reservoir 95 is maintained through the agency of the chamber 101 which permits the air to pass around the perimeter of the disc valve. Compression of the bellows decreases the total volumetric capacity of the pneumatic suspension system with the result that the internal pressure is increased and compression of the bellows is progressively increasingly resisted. A progressive increase in rate upon compression also results from an increase in effective "piston area" caused by the bellows walls progressively contacting the adjacent surfaces of portions 55.

56 and 57 of girdle ring 53 and the rounded portions of the rings 65.

It will be observed from the arrangement shown in Figure 4 that further movement of the lower end of the bellows, during a compression phase, is not in a vertical direction parallel to its normal axis. This is because of the unequal length of the upper and lower parallelogram arms and the different relative positions of their axes of rotation, the result being to cause the bottom casting 69 to move from the position shown in full lines in Figure 4 about an arc 118 to the position shown in broken lines therein. Because of said arcuate movement the bellows 49, in its compression phase of operation, has the lower right side of its portion 51 engaged with the adjacent upper portion of the flange on the girdle ring 53, and has the upper left-hand side of its portion 52 engaged with the adjacent lower portion of the flange on said girdle ring, or in other words, the engagement is on opposite sides of the flange at diametrically opposite points thereof. Interengagement of the parts as described serves to retard and resist lateral displacement of the central restricted portion of the bellows.

Upon rebound or reaction from the compression phase described, elongation of the bellows causes the air to flow thereinto, thus forcing the valve disc onto its lower seat 103 and substantially shutting off communication between the reservoir and bellows. The arrangement is such as to prevent the immediate return of the air pressure from the reservoir to the bellows with the result that rebound is minimized. The ports 105 permit controlled, delayed return of air from the reservoir to the bellows.

The overturning tendency of centrifugal force occurring while a vehicle is rounding a curve has been recognized heretofore. The "soft" independent front wheel suspensions placed on passenger vehicles in recent years have aggravated this condition to such an extent as to result in definite unfavorable reactions on the part of the driving public. The presence of a valve between the bellows 49 and reservoir 95, arranged to close when a pendulum above the valve swings outwardly by centrifugal force due to rounding a curve, makes available for resisting the overturning tendency, the much higher rate of the bellows alone. This action of the valve will be apparent from reference to Figures 4 and 5 wherein it will be seen that when the pendulum 106 swings angularly, as indicated in broken lines, the extension 112 on the lower end of the pendulum moves out of alignment with the raised portion 104' of the valve disc 104, whereby the latter is permitted to be forced upwardly into engagement with the upper valve seat 102, and thereby completely shut off communication between the bellows 49 and reservoir 95. Thus the inclination or tilting of the chassis is retarded by the higher compression rate of the bellows without the reservoir, in the manner set forth.

The same valve action is employed to counteract the nosing down of the front of the vehicle body as the result of braking the vehicle, which nosing down is much more noticeable in vehicles employing independent front wheel suspensions of low rate. As the vehicle is braked, the pendulum 106 swings to the front, as indicated in broken lines in Figure 5, and permits the valve disc 104 to shut off communication between bellows and reservoir as previously described. In this manner the nosing down of the vehicle is retarded and checked solely by the bellows, as increasing pressure builds up in the latter due to contraction thereof. As an example, the static rate of the suspension, with reservoir cut off, is 160 pounds per inch at bellows length of 7½ inches, as compared to 92 pounds per inch when a 600 cubic inch reservoir is in communication with the bellows. See Fig. 46.

The pin 117 in the valve casing restricts the swinging movement in determinate directions, it being understood that said pin will be positioned on the opposite side of the valve casing employed in the suspensions on the opposite side of the vehicle. The rubber member 109 is employed to render the valve action substantially noiseless inasmuch as the movement of the pendulum bob 107 usually is of sufficient extent to cause it to strike the inside wall of the valve casing. Furthermore, the raised portion 104' of the valve discs 104 may vary in diameter according to the horizontal acceleration or deceleration at which it is desired to have the valve operate. Thus the smaller the diameter of portion 104' the lower the acceleration at which operation occurs, and conversely, the larger the diameter the higher the acceleration required, the arrangement being such that the operation of the valve can be definitely controlled. The valves in the suspensions at the rear of the vehicle may be positioned at an angle of 180° to those at the front of the vehicle so as to minimize the depressing of the rear portions of the vehicle due to power acceleration.

Since the specific heat of air does not vary appreciably over the range of pressures used, compression and expansion thereof approach an adiabatic condition. The shape of the pressure volume curves deviates appreciably from the approximately sinusoidal displacement-time chassis vibration curve, indicating the tendency of the system to minimize propagation of synchronous vibrations.

Some heat flow to and from the enclosing structures does occur, and some slight temperature increase results from friction effects. The extent of both is influenced by the time and rate of the expansion and compression. This transfer and loss of heat results in a somewhat graduated dampening action, which action increases with the rate of application of compression or expansion. The magnitude of these effects increases considerably with the closure of the pendulum valve.

The embodiment of the invention shown in Figure 6 of the drawings differs from that previously described mainly in the feature of flat leaf springs 119, 119, shown as four in number, which springs are secured at their lower ends to the pendulum bob by means of respective screws 120, said springs being arranged about 90° apart circumferentially of the bob. The upper ends of the springs are free, and extend outwardly of the bob into engagement with the inner face of the valve casing. The springs 119 have sufficient rigidity to prevent oscillation of the pendulum due to vibration arising from irregularities of a roadway. They are, however, sufficiently resilient to permit the pendulum to oscillate under the impetus of centrifugal force resulting when the vehicle is driven around a curve, and likewise to oscillate under the impetus of inertia when brakes are applied to retard the vehicle. Otherwise the operation and function of the valve is identical with operation and function of the valve shown in Figure 5 and previously described. This embodiment of the invention is advantageous in that free movement of the pendulum yieldingly is prevented.

The embodiment of the invention shown in Figure 7 utilizes many of the elements used in the structure shown in Figure 5, which elements carry the same reference numerals employed in the previous description of them. In the construction shown in Figure 7, a portion of a chassis 121 has a hollow, hemispherical cap 122 secured thereto by bolts 123, said chassis part being formed with a hemispherical recess so that with said cap a spherical recess or socket 124 is defined, which socket has a rubber lining or gasket 125 therein. Mounted within the socket 124 and gasket 125 is a spherical ball 127 that is formed with a stem 126, the latter extending downwardly through a suitable opening in the bottom of the cap and chassis, and having its lower end portion mounted in the upper end portion of a tube 128 to which it is secured by a pin 129. Mounted upon the upper end portion of tube 128 is an upper end plate 130 that is formed on its outer periphery with a downwardly extending flange 131, and has an axial opening surrounded by a flange 132, said tube being mounted in said opening and preferably welded to flange 132 to provide an air-tight connection thereat. A second tube 133 is telescopically mounted upon the lower end portion of tube 128 in spaced relation thereto, and axially spaced apart collars or bearing sleeves 134, 134 are positioned in the space between the tubes and secured to outer tube 133. The bearing sleeves 134 prevent the passage of air between the telescoped tubes, and a metal disc 135 is secured within the tube 133 at its lower end, substantially below the lower end of tube 128, to seal the outer tube 133 against the passage of air therethrough. The tube 133 is connected at its lower end to a wheel support (not shown).

Mounted upon the upper end portion of tube 133 is a lower end plate 136 that is formed on its outer periphery with an upwardly extending flange 137, and has an axial opening through which the tube 133 extends, said opening being surrounded by a flange 138 that is welded or otherwise secured to the tube 133 so as to provide an air-tight connection thereat. A bellows 139 of a construction somewhat similar to that shown in Figure 4, but identified as type #2, is positioned between the upper and lower end plates 130, 136 respectively. Said bellows has beads 60 at its opposite ends, and clamping rings 62 secured to the said end plates engage said beads in the manner previously described in connection with the structure shown in Figure 4. The bellows likewise is formed with a constricted medial portion 140 having an inside diameter that is less than the inside diameter of the bead portions of the bellows. In this embodiment of the bellows the constricted portion is formed with a circumferential bead 141 disposed substantially midway of its ends, which bead produces a circumferential groove on the inner surface of said constricted portion. An annular reinforcing or spacing member 142 is mounted interiorly of the bellows, which member comprises cooperating half sections in the form of metal stampings. The outer peripheral portions of said stampings are curved backwardly over themselves as shown at 143 so that they fit nicely within the groove formed by bead 141. Adjacent the inner periphery of the stampings the metal is formed with oppositely extending offset portions, as shown at 144, and encased in said offset portions is an annular metal wear-ring or bearing 145 that slidably embraces the tube 128, the arrangement being such as to permit unrestricted longitudinal movement of the bellows with relation to the tube, and at the same time to provide a guide and support for the constricted portion of the bellows. The member 142 is formed with a plurality of openings 146 therethrough to provide communication between the upper and lower regions of the bellows.

The bellows 139 is provided with a girdle ring 147 that consists of cooperating half sections, the assembled ring having inwardly extending upper and lower circumferential margin flanges 148 that engage the surface of the constricted portion 140, the juncture of the ring and flanges being formed with a substantial radius 149. The function of the girdle ring 147 is substantially the same as the function of girdle ring 53 of Figure 4, that is, to prevent sharp flexing of the bellows and at the same time to provide for increasing the resistance to the compression phase of operation of the bellows.

In this embodiment of the invention the valve mechanism is similar to the valve mechanism shown in Figures 4 and 5 and therefore no detailed explanation of its construction is believed necessary. The valve is disposed between the bellows 139 and a tank or reservoir, and is mounted upon the upper end plate 130, exteriorly of the bellows, said end plate being provided with an opening 150 that provides communication between the valve and bellows.

In operation, upon compression of the bellows the pressure therein increases gradually in proportion to the extent of such compression, said pressure resisting and retarding compression and also absorbing the shock that is causing the compression. Upon compression of the air in the bellows the valve disc 104 is forced off its lower seat. Upon subsequent expansion or elongation of the bellows the said valve disc seats upon the lower valve seat and shuts off the passage of air into the bellows except by way of the openings 105, with the result that recoil is resisted.

The embodiment of the invention shown in Figure 8 is very similar to that shown in Figure 7 so that the structural features thereof do not need repetition as to their assembly and operation. It will be observed that the girdle ring shown in Figure 8 is identical with that shown in Figure 4, which indicates that various types of girdle rings may be employed for the purpose intended provided they include the salient features previously set forth. Attention is directed to the fact that in this particular instance the bellows, designated 49', is of slightly different proportions than the bellows shown in Figure 4, being what is termed the No. 4 bellows.

It has been found that, under certain conditions, it is not desirable to mount the valve mechanism upon the bellows structure as shown in Figure 7, wherefore the valve shown in Figure 8 is shown mounted in the tank or reservoir 95. Communication between the bellows and reservoir is effected by means of a pipe 151 that has one end mounted in a fixture 152 that is secured to the upper end plate of the bellows in such a manner as to establish communication with the interior of the bellows, said fixture preferably being welded in place to procure an air-tight connection. The other end of pipe 151 has air-tight connection with a valve cover 86 of the same construction as that shown in Figure 4, said cover 86 being bolted to the bottom of the reservoir 95 exteriorly thereof. Associated with the cover 86 is a valve casing 85 that projects upwardly into the said reservoir and has a cap 153 removably mounted upon its upper end, said cap being formed with openings 154 therethrough for providing communication between the interior of the reservoir and the interior of the valve casing. A pendulum 106 is suspended from the cap 153 by means of a ball 113 at its upper end, in the manner previously described. The lower end of the pendulum bob 107 is provided with a cup-shaped rubber member 155 that is similar to the member 109, Figure 5, but is radially slotted about its perimeter to provide spaced fingers or extensions 156. Said extensions are adapted to engage the inner wall of the valve casing during pendulous movement of the bob, and thus to prevent noise, and to prevent impact which otherwise would result in noticeable vibrations.

As is clearly shown in Figure 9, the valve disc 104 is formed on its perimeter with a pair of spaced tongues or radial projections 157 that loosely straddle one of the bolts that hold the valve-casing parts together, the arrangement being such as to prevent angular movement of the disc. The raised portion 104' on the valve disc is not circular in plan as in the previously described embodiments of the invention, but is formed with two flat sides 158 and 159, which sides are disposed at right angles to each other. When mounted for use in a vehicle, the flat side 159 faces the front of the vehicle and flat side 158 faces laterally of the vehicle as viewed from the driver's seat. The arrangement permits the valve disc to rise when the pendulum swings in the direction of said flat sides, which swinging is the result of applying the brakes, and/or from rounding a curve in a determinate direction. It will be understood that the laterally facing flat side 158 will be oppositely disposed in the valve associated with the suspension unit on the opposite front wheel of the vehicle. The arcuate surface of raised portion 104' is of such extent that said raised portion is engagable with the extension 112 on the bottom of the pendulum in all angular positions of the pendulum except the two positions thereof that carry its extension 112 radially outwardly of flat faces 158, 159.

In Figures 10 to 12 is shown another embodiment of the valve, which valve is designed for installation in the same situation as the valve shown in Figure 5. It comprises a dome-like upper portion or cover 86 that is mounted upon the overhanging portion 74 of housing 75. Threaded into cover 86 and extending downwardly therefrom is a hollow cylindrical casing 161 having an annular cap 162 bolted to its lower end. Suspended axially within the casing 161 is a pendulum 163 that is supported from the cover 86 by a ball and socket connection 164. Permanently secured to the pendulum adjacent its lower end is a bob 165, and abutting the lower end of the latter and projecting radially beyond the perimeter thereof is a disc-like rubber bumper 166. Said bumper is secured in place by a nut 167 that is threaded onto a projecting lower end portion of the pendulum 163, said nut having an axial projection that extends through the bumper to center and reinforce it. The lower end of the pendulum is formed with a valve-engaging extension 168 in a manner similar to previously described structures.

Formed in the lower end portion of casing 161 is a rounded, upper valve seat 170 and formed in the cap 162 is a rounded, lower valve seat 171, said seats being axially spaced from each other, and there being a concentric chamber 172 of larger diameter about the space between said seats. Mounted in the space between the said valve seats is a valve disc 173 having a circular raised axial region 173', the top of which is covered by a rubber disc 174 that is secured thereto by the head of a downwardly extending axial stem or spindle 175. Both sides of the peripheral region of the valve disc are covered with a rubber facing 176 that is of such radial width that it engages the valve seats 170, 171 in the operation of the valve. The stem 175 is slidably mounted in a tubular guide structure 177 that is supported below the valve disc by diametrically arranged webs 178, 178, Figure 12, carried by the cap 162. A plurality of by-pass apertures 179, 179, Figure 12, are formed in the cap 162 connecting the chamber 172 with the exterior of the valve structure.

The inside diameter of the valve casing 161 is smaller at its lower end portion than in its upper regions, and in the region thereof that circumscribes the rubber bumper 166, indicated at 180, it is of such diameter throughout the major portion of its circumference as to limit the oscillating movement of the pendulum, which limit is such as to prevent the extension 168 on the lower end of the pendulum from moving out of alignment with the raised portion 173' of valve disc 173. At two regions 90° apart the region 180 on the interior of the valve casing is formed locally with arcuate recesses 181, 181, which recesses are substantially of the same radius as the bumper 166. The arrangement is such that when the pendulum oscillates in the directions that permit the bumper 162 to enter either recess 181, the extension 168 on the pendulum is disposed laterally of extension 173' of the valve disc, as indicated in broken lines in Figure 10, and the latter may then rise and seat itself upon the upper valve seat 171.

When the valve is installed in a resilient suspension on a vehicle, the recesses 181 are so angularly positioned with relation to the vehicle as to permit full oscillation of the pendulum only when the vehicle is braked, and/or when it is moving in a determinate direction in rounding a curve. The rubber facings on the valve disc 173 make for quietness of operation, and also assure that the disc will form a fluid-tight seal with both valve seats, notwithstanding slight irregularities in the surface of the latter. The stem 175 keeps the valve disc centrally positioned under all conditions of operation.

The embodiment of the invention shown in Figure 13 is substantially similar to that shown in Figure 10, with the exception of the valve disc 183 and the upper and lower valve seats 184, 185 respectively, the latter being flat instead of rounded. The valve disc 183 is covered, except for its axial raised portion 183', with a facing of rubber 186, and the outer periphery of the latter is formed with an integral circumferential rubber bead 187 that extends above and below the facing surface and is adapted to engage the upper and lower valve seats 184, 185 in the operation of the valve.

The embodiment of the invention shown in Figures 14 and 15 comprises the usual hollow casing 190 having an annular cap 191 bolted to the bottom thereof, said casing having a pendulum 192 mounted therein, which pendulum has an extension 193 at the bottom thereof. Complemental grooves or recesses are formed in the adjacent faces of the casing and cap so as to constitute a concentric chamber 194 about the axial opening in the bottom of the structure. The faces of the said recess adjacent the central opening in the casing and cap constitute upper and lower valve seats 195, 196 respectively for a rubber flap valve 197. The latter has marginal thickened portions or beads adapted to engage with said valve seats. The flap valve 197 is integrally connected to an annular rubber gasket 198 by means of a flexible, radially-extending tongue 199, said gasket being confined in a suitable recess formed concentrically in the adjacent faces of the casing 190 and cap 191. The tongue 199 is of such stiffness as normally to hold the flap valve 197 in horizontal position, midway between the upper and lower valve seats. The valve 197 is adapted to move angularly about the tongue 199 as a hinge, and said upper and lower valve seats are disposed in planes that converge toward said tongue so that the marginal bead of the valve will rest flush against said seats in its alternative positions of angular movement.

Molded into the rubber flap valve 197 is a metal reinforcing disc 201 that has an axial extension or boss 202 extending upwardly above the rubber structure, the top of said extension engaging the extension 193 on the lower end of the pendulum when the latter is in vertical position. The sidewall of the boss 202 is concentric with the axis of the valve structure throughout the major portion of its extent, but on two adjacent sides it has flattened regions 202a, 202a disposed at right angles to each other. When the valve structure is mounted in a vehicle, the said flattened regions 202a are positioned so as to face the front of the vehicle and the nearest side thereof. The arrangement is such that the extension 193 of pendulum 192 will engage the top of boss 202 except when the pendulum swings angularly in the proper direction to move its extension 193 past flat faces 202a of the valve boss, whereupon the valve may be lifted into engagement with the upper valve seat 195. This occurs when the vehicle is braked or when it is rounding a curve, at which time compression of the bellows causes air to flow outwardly therefrom to lift the valve as described.

Rebound of the vehicle, which effects elongation or expansion of the bellows, causes air to flow downwardly through the valve toward the bellows, and thereby causes the flap valve 197 to flex downwardly and seat upon lower valve seat 196. This retards the flow of air back into the bellows, but by-pass openings 203, 203 are formed in the cap 191, extending from the chamber 194 to the exterior of the valve, to permit a slow passage of air into the bellows when the valve is engaged with the lower valve seat. When the flap valve is in the normal position shown in Figure 14 there is unrestricted flow of air around it, said valve being moved toward either valve seat by inertia forces due to vertical accelerations of the body, as hereinafter described. It will be understood that when the valve approaches either valve seat sufficiently to appreciably restrict the flow of air, the valve will be operated by differential air pressure. The valve 197 may be of sufficient weight to be responsive to vertical accelerations or may be provided with a suitable weight 197a, similar to the weighted valve shown in Figs. 17, 18 and 19 hereinafter described.

The embodiment of the invention shown in Figure 16 is somewhat similar to that shown in Figure 8 in that the valve structure is mounted interiorly of the reservoir 95. The valve structure has a cover 205 secured to its lower end, exteriorly of the reservoir, the pipe 151 that extends to the bellows having communication with the valve through said cover. Said cover also is provided with a valved connection 206 through which air under pressure may be introduced into the pneumatic suspension unit.

The valve structure is provided with a tubular casing 208 that is formed with a multiplicity of radial apertures 209, 209, and the top of said casing is provided with a screwed-on cap 210 that has a circumferential series of axially extending apertures 211, 211 formed therein. The valve structure also includes a flap valve, valve seats, and pendulum that are identical with those shown in Figures 14 and 15 and are designated by the same reference numerals.

The valve functions in the same manner as that shown in Figure 14. The apertured casing and cap of the valve structure act as a muffler to subdue noises arising from the operation of the valve. The feature of mounting the valve structure in reservoir also assists in achieving this result.

The embodiment of the invention shown in Figures 17, 18 and 19 is known as an inertia valve. It performs the same function as the valves previously described, and has the added function of preventing an excessive transfer of air from the bellows when the vehicle strikes a bump or rut of larger than average size, with the result that "bottoming" is obviated. The valve structure is mounted in the upper part of the bellows in the manner previously described, being supported by the overhanging portion 74 of the housing 75, and being provided, exteriorly of the bellows, with a cover 86 in which one end of the pipe 93, that communicates with the reservoir, is mounted.

Interiorly of the bellows the valve structure includes a tubular valve casing 213, and to the bottom of the latter are secured a plurality of annular, axially aligned, cap-like members 214, 215 and 216 that are secured to the casing 213 and to each other by cap screws 217, 217. Suspended from the cover 86, within the casing 213, is a pendulum 192, and between said casing and the immediately sub-jacent cap member 214 is a chamber 194 having upper and lower valve seats 195, 196 respectively, there being a flap valve 197 mounted in said chamber adapted alternatively to engage with said valve seats. Said pendulum, flap valve, and valve seats are identical with similar elements shown in Figure 14 and bear the same reference numerals. The cap-member 214 is formed with a plurality of by-pass apertures, such as that shown at 218, Figure 17, which apertures extend from the chamber 194 to the perimeter of the cap-member.

The upper face of cap-member 215, that abuts the lower face of member 214, is formed with a plurality of relatively shallow, radial slots 220, 220, as is most clearly shown in Figure 18, which slots constitute by-passes for air, upon occasion, as presently will be explained.

Formed in the adjacent faces of the cap-members 215, 216, and circumscribing the axial openings thereof is a chamber 222, of which that part thereof that is formed in cap-member 215 is identical with that portion of chamber 194 that is formed in casing 213, said chamber 222 having a valve seat 223 formed about its inner margin.

Mounted in said chamber 222 is a flap valve 224 that is identical with flap valve 197 except that it is disposed in inverted position, and the axial extension 202 of its metal insert is weighted, as by a filling of lead 225. That portion of the chamber 222 that is in cap-member 216 has a plurality of lugs 226, 226 extending radially inwardly to a region beneath the marginal portion of flap valve 224, said lugs constituting rests which support the flap valve normally in horizontal position. The lugs 226 are triangular shaped in section, as is most clearly shown in Figure 19, thus providing ample space for the passage of air between adjacent lugs and about the perimeter of the flap valve.

In the operation of the valve structure shown in Figure 17, when the vehicle wheel strikes a deep rut or sharp elevation such that the valve structure plunges suddenly downwardly as the bellows is momentarily expanded and then compressed, the inertia of the flap valve 224, due to the weight 225 therein, causes such relative movement of the valve structure and said flap valve as to seat the latter upon valve seat 223 and thereby to prevent a large outrush of air from the bellows through the central openings and chamber 222 in cap-members 215, 216 and preventing bottoming. Thus the air in the bellows can escape only through the restricted by-pass openings 220, and then past flap valve 197, the latter functioning in the manner previously described. The inertia flap valve 224 remains in engagement with the valve seat 223 until the high pressure of air in the bellows is relieved by the escape of air through the said by-passes 220, whereupon it resumes its normal position of rest upon the lugs 226. Under ordinary driving conditions the weight of the inertia flap valve and the area of the passageway in chamber 222 are sufficient to permit flap valve 224 to remain in its horizontal position.

In Figure 20 is shown another embodiment of the invention, which may be used in conjunction with the type of suspension illustrated in Figure 7. It comprises a valve casing 229 that is formed with a laterally extending circumferential flange 230 adjacent its lower end, the under side of said flange resting upon the upper end of a tubular extension 231 rising from a member 232. The latter may be an integral part of the upper end plate 130 of the bellows shown in Figure 7, it may be an integral part of the overhanging portion 74 of the housing 75 shown in Figure 4, or it may be a separate member suitably secured to said members 130 or 74. The extension 231 is exteriorly threaded to receive a locking nut 233 that has a portion engageable with the upper side of the flange 230 for securing the casing 229 in place. Said casing is formed with an axial opening 234 in its upper end that constitutes a socket for receiving a ball or spherical end portion 235 of a threaded stem 236. A plate 237 is mounted upon the top of casing 229 and removably secured thereto by cap screws 238, 238, said plate covering the axial socket 234 so as to retain the ball 235 therein, and to prevent the passage of air therethrough. Threaded onto the stem 236 is a weighted member or pendulum 239, that is generally cylindrical in shape and has a tapered upper end portion. Formed in the lower end portion of the pendulum 239 is an axial bore 240 that merges into two oblique bores or passages 241, 241 that terminate on the tapered upper portion of the pendulum. The bore 240 gives access to a locking screw 242 threaded into the pendulum structure against the lower end of stem 236.

The lower end of the pendulum 239 is formed with a spherically convex surface 244 that lightly rests against a complementally spherically concave surface 245 formed on the upper side of member 232, within the extension 231 of the latter, said concave and convex surfaces being generated about the axis of the ball 235. The arrangement is such that the pendulum 239 has universal angular movement about the axis of said ball. The valve casing is provided with a port 246 that has connection with a pipe (not shown) that extends to the reservoir 95 of the suspension system.

The member 232 is formed with an opening or bore 247 coaxially of the concave surface 245. When the pendulum 239 is in its normal, vertical position, bore 247 is in alignment with bore 240 of the pendulum, with the result that air may pass through the valve in flowing to or from the reservoir and bellows. When the pendulum is moved angularly about its axis, due to centrifugal force or from other causes, as previously set forth, bore 240 moves out of alignment with opening 247 with the result that the latter may be partly or completely closed, whereby communication between the bellows and reservoir is interrupted. The extreme angular position of the pendulum 239 is shown in broken lines in Figure 20.

In Figures 21 to 24 inclusive is shown a valve structure embodying the general features of the valves previously described, and in addition including a supplementary valve that operates, upon occasion, when the differential of air pressure in the reservoir and bellows exceeds a determinate maximum. The construction is designed to meet the condition which arises when the vehicle passes over a closely spaced succession of bumps or ruts which results in successively compressing the bellows in such rapid sequence that the latter does not become fully reinflated between contractive phases. When this condition obtains, the pressure in the reservoir builds up rapidly until it reaches a determinate maximum, whereupon the supplementary valve automatically opens to admit air directly from the reservoir into the bellows.

Referring now to Figure 21 of the drawings, the illustrated valve comprises the usual cover 86 mounted upon the flange 83 of overhanging portion 74 of the bellows housing, said cover having a port opening into pipe 93 that extends to the reservoir of the system. Threaded into the cover 86 and extending downwardly therefrom into the bellows is a tubular valve casing 250, and secured to the lower end of said casing is an annular cap 251. Between the cap and casing is an annular chamber 252, there being the usual upper and lower valve seats 253, 254 respectively about the inner margin of said chamber, where it opens into the central opening of the valve structure. The cap 251 is formed with a transverse web 255 that carries an axial sleeve 256 in which is mounted a pin 257 having an enlarged head or flange 258 at its upper end, which flange constitutes a guide for a metal valve disc 259. The latter is formed with an upwardly projecting axial extension 260 that is of inverted cup-shape and fits over the guide flange 258. The cap 251 is formed with a plurality of relatively small by-pass apertures 261, 261 extending from the chamber 252 to the bottom face of said cap.

Suspended from the cover 86 is an axially disposed pendulum 263 that has an extension 264 at its lower end adapted to engage the extension 260 of valve disc 259 and thereby to prevent the latter from seating on the upper valve seat 253 when the pendulum is in vertical or nearly vertical position. An abutment 265 on the inner wall of the casing 250 prevents the pendulum from swinging angularly in that direction a sufficient distance for the extension 264 of the pendulum to clear the extension 260 of the valve disc. The foregoing elements of this valve operate substantially in the same manner as in the valve structures previously described so that further explanation thereof will not be required.

Formed on the casing 250, near the upper end thereof, is a vertical flattened region 268 having an aperture 269 therein, and a flat valve seat 270 on the outer face of said flattened region, surrounding said aperture. Mounted upon said flattened region by means of cap-screws 271, 271 is a generally circular bridge-plate 272, the latter being formed with a plurality of peripheral lugs 273, 273 that are disposed perpendicular to said plate and bear against said flattened region for the purpose of maintaining the bridge plate in spaced relation to the valve seat 270. Positioned between the bridge plate 272 and valve seat 270 is a disc-valve 274 that is maintained in proper relation to the said valve seat by the lugs 273. The bridge-plate 272 and valve disc 274 are formed with respective axial dished portions 272a, 274a respectively, which portions are disposed so as to open toward each other and thus receive the respective ends of a compression spring 275 that is mounted between the bridge-plate and valve disc, and which exerts determinate yielding pressure upon the latter to hold it normally against the valve seat 270.

The arrangement is such that when there is a determinate differential pressure in the reservoir and bellows, due to conditions previously explained, the supplementary valve 274 automatically opens and permits air to flow from the reservoir to the bellows at a much faster rate than it could flow through the by-passes 261. The result is quickly to relieve an undesirable condition, and thus to prevent "bottoming" of the bellows.

In Figures 25 and 26 is shown another form of the supplemental, differential valve previously described. As shown, the casing 277 of the pendulum valve structure has an annular insert 278 mounted in the wall thereof, which insert comprises a concentric valve seat 279 on the outer face thereof. Engageable with the valve seat 279 is a disc valve comprising a metal disc 280 having a facing of resilient rubber composition 281 thereon, said facing being formed with a bead about its margin for sealing contact with the valve seat. The rear face of the valve disc 280 is formed with a wide lug 280a that is apertured at its opposite ends for connection with two tension springs 282, 282, the other ends of said springs being connected to respective apertured studs 283, 283 threaded into the casing 277 interiorly thereof. Said studs are so arranged that the springs are disposed at opposite sides of the pendulum in said casing, so that said springs do not hamper free oscillation of said pendulum.

The springs 282 are adjusted to the proper tension to hold the disc valve closed until the differential pressure in the reservoir and bellows reaches a determinate maximum. The valve will then open and perform the same function as the supplemental valve shown in Figure 21.

In Figure 27 is shown still another form of supplemental differential valve. As shown in said figure, the casing 285 of the pendulum valve structure has an annular insert 286 welded into its wall, said insert comprising a concentric valve seat 287 formed on its exterior face, and a ring 288 mounted within its inner periphery and extending, like a flange, above the surface of said valve seat. A frusto-conical valve member 289 extends through the ring 288 and has its smaller end connected to one end of a leaf spring 290, the other end of the latter being secured to the casing 285 by a bolt 291. Exteriorly of the casing, the peripheral margin at the large end of the valve member 289 is reversely curved outwardly so as to extend over the edge of the ring 288 and into engagement with the valve seat 287. The arrangement is such that air pressure within the casing 285 is directed outwardly against the valve member 289, and the latter will open a substantial distance when determinate pressure is exerted upon it, thus avoiding "chattering." The spring 290 is of proper strength to hold the valve closed until the determinate differential pressure is reached and said spring is so positioned as not to interfere with the normal operation of the pendulum valve.

The embodiment of the invention shown in Figures 28 and 29 in general is similar to those previously described, its distinguishing feature residing in the use of a flexible valve member. The valve structure comprises the usual casing 294, annular cap 295 secured to the bottom of said casing, and pendulum 296 suspended at the axis of the casing. The adjacent faces of casing and cap are recessed to provide a concentric chamber 297 having upper and lower valve seats 298, 299 respectively about its inner periphery and there are the usual by-pass apertures 304 extending through said cap from the chamber 297 to the outer face of the cap. The cap 295 is formed with a transverse web 300 that carries an axially apertured sleeve 301 in which is mounted a pin 302 slidable within the apertured sleeve 301 (inertia operated) that carries a generally cylindrical guide member 303 at its upper end. The said guide member 303 may be formed of metal or some suitable fibre, and it is provided with a pair of spaced apart circumferential ribs or flanges 303a, 303a.

Mounted upon the guide member 303 is a valve member that comprises a tubular, metal axial member 305 that is of inverted cup shape and which fits over said guide member in slidable contact with the flanges 303a thereof. Vulcanized to the outer face of axial member 305 is a circular, flange-like flexible rubber valve 306, the upper and lower fillets at the juncture of the rubber and the axial member being reinforced with metal grommets 307, 307. The rubber valve disc extends between the valve seats 298, 299, and is adapted alternatively to seat thereon, as indicated in broken lines in Figure 28, during the operation of the valve. Being flexible, the rubber disc is capable of fluid tight engagement with the valve seats, and yet the rubber is sufficiently stiff to prevent it from being forced through the central opening of the valve structure under any pressure which may be set up in the suspension system. The use of a rubber valve disc also assures quiet operation.

In the embodiment of the invention shown in Figures 30 and 31 there is a tubular casing 310 mounted interiorly of the reservoir 95, said casing having an open cap 311 mounted upon the top thereof, from which cap the usual pendulum 312 is suspended. Secured to the lower end of the said casing 310 by means of screws 313, 313, is an annular cap 314 having a central opening 315, said cap being threaded into a cover member 95a that is secured to the exterior of the reservoir 95 and has communication, through the pipe or conduit 151, with the bellows of the system. The adjacent faces of the casing 310 and cap 314 are radially recessed, between the screws 313, to provide chambers or fluid passages 316, 316 opening into the central openings of the casing and cap. Confined between the said casing and cap is a thin, sheet metal member or washer 317 that is shaped to conform to the adjacent faces of casing and cap, and in the regions between passages 316 is formed with inwardly extending V-shaped formations 318, 318, the pointed ends of which are exposed.

The exposed, pointed ends of formations 318 constitute a seat for a valve disc 319 that is formed with radially outwardly extending portions 319a, 319a that extend into alternate fluid passages 316. Above the valve disc 319 is an annular valve seat 320 that is mounted in the casing 310 and which is engaged by the said valve disc, upon occasion, when the latter is forced upwardly. The valve disc 319 normally is retained on its seat on the V-shaped formations 318 by means of an extension 321 on the lower end of pendulum 312, which extension engages an upwardly extending portion 322 formed axially on the valve disc 319. When the pendulum oscillates in determinate directions the extension 321 clears extension 322 and the valve disc is permitted to rise and seat upon valve seat 320, as in previously described embodiments of the invention.

The top face of cap 314 is formed with an annular valve seat 324 disposed between its axial opening 315 and the fluid passages 316. Normally resting upon valve seat 324 is a circular valve disc 325 capable of axial movement between said valve seat 324 and the pointed inner ends of the V-shaped formations 318. A plurality of by-pass apertures 326, 326 extend through cap 314 from the fluid passages 316 therein to the lower face of the cap.

In the operation of the valve, assuming the various elements thereof to be in the positions shown in Figure 30, compression of the bellows forcing air through pipe 151 and into the valve structure will lift valve disc 325 off its seat 324 and hold it against V-shaped formations 318. This permits the air to pass around both valve discs 325, 319 by way of the alternate fluid passages 316. When the bellows elongates and flow of the fluid is reversed, the valve disc 325 seats upon valve seat 324 and the air slowly flows past the valve by way of the by-pass apertures 326.

If the bellows is compressed while the pendulum is swung angularly so that pendulum extension 321 is clear of valve disc extension 322, lower disc 325 will rise as previously described, and the air impinging upon the radial extensions 319a of upper valve disc 319 will lift the latter off the V-shaped formations 318 and move the disc into sealed engagement with upper valve seat 320. This prevents further flow of air through the valve structure. The movement of the valve discs is reversed as soon as the bellows begins to elongate.

The arrangement is such that each valve disc moves a relatively short distance as compared to the single valve discs of previously described structures, with the result that the valve action is more rapid and also is accomplished with less noise.

The embodiment of the invention shown in Figures 32 to 34 in many respects is similar to that shown in Figure 30. It is shown mounted in the bellows portion of the suspension system, and comprises a casing 328, pendulum 329, upper valve seat 330, fluid passages 331, upper valve disc 332, and intermediate washer 333, all of which members are substantially identical to those shown in Figure 30 and function in the same manner. Secured to the lower end of the casing 328 is an annular cap 334 that is formed with a diametric web 335 that carries a centrally disposed, axially apertured guide structure 336. Seated in a concentric groove on the upper side of guide structure 336 is a compression spring 337 upon the top of which is a valve-disc support 338. A headed guide stud 339 extends freely through member 338 and through structure 336 and is adjustably retained by means of a nut 340 threaded onto its lower end. A circular valve disc 341 is supported upon disc support 338. The inner periphery of the cap 334 is beveled or flared downwardly as shown at 342, except in the regions of the screws 313 that secure the cap to the casing, the perimeter of the valve disc 341 normally being positioned closely adjacent that region of the cap where its inside diameter is smallest. Above the normal position of valve disc 341 the cap 334 is formed with a plurality of fluid passages 343, 343 that are in alignment with similar passages 331 found in the casing 328.

The valve operates in exactly the same manner as that shown in Figure 30 when the bellows is compressed and air forced through the valve upwardly from its lower end. When the bellows elongates and air flows through the valve in the opposite direction, the valve discs assume the positions shown in Figure 32, the air slowly passing the lower disc 341 by reason of the slight clearance between the periphery of the latter and the inner periphery 342 of the cap 334. In the event that a large differential of fluid pressure is built up on opposite sides of the valve, due to a continuous series of bumps or jolts, the velocity head of air above the lower valve disc 341 will force the latter, against the pressure of spring 337, downwardly below its normal position, with the result that an opening of progressively increasing area is provided by reason of the flared inner periphery of the cap 334. The arrangement is such that equilibrium of pressure quickly is established in the system.

The valve structure of Figure 32 possesses all the advantages of that shown in Figure 30, and in addition accomplishes the functions of the previously described valves shown in Figures 21 to 27 inclusive.

A further valve structure having operating characteristics similar to the structure shown in Figures 32 to 34, inclusive, is shown in Figures 35 to 39, inclusive. The valve proper is carried by the usual casing 345 which is in turn carried by a plate 346 covering the upper end of the bellows. The casing is screw threaded in a sleeve 347 integral with the plate 346 and is disposed centrally thereof. The upper end of the sleeve 347 has a cap member 348 fixed thereto by suitable cap screws 349. The cap 348 has a port 350 in which one end of a metal tube 351 is mounted and secured by welding or brazing. The other end of the tube 351 has an annular corrugation over which a suitable flexible tube 352 is slipped and held in fluid tight engagement by means of an annular collar 353. The tubing 352 is utilized to connect the bellows to the reservoir (not shown).

The valve casing 345 has an upper valve seat 354 and has an annular cap 356 secured to the lower end thereof by means of suitable cap screws 357. The cap 356 has a lower valve seat 358 and has a spider structure supporting a centrally disposed guide structure 359. Relief ports 361 extend through the cap and are adapted to by-pass air past the valve seat 358. The casing 345 has an open cap 362 threaded in its upper end and said cap has a bearing 363 by which a pendulum 364 is suspended for universal, pivotal movement. The inside of the casing 345 has inwardly extending projections 366 and 367 which limit the pivotal movement of the pendulum 364 in the casing. The spaces between the projections provide ample passageway for the flow of air between the casing and the pendulum. It is to be noted that there are recesses 368 provided on opposite sides of projection 367 and are spaced angularly by an amount of 90° in order that the pendulum may operate under the force of momentum during acceleration and deceleration of the car, and when rounding curves, as has been described with reference to Figures 10, 11 and 12. The action of the valve shown in Figures 35 to 39, inclusive, is similar to that of the valve shown in Figures 32 to 34, inclusive, in that there are two valves in series, one of which is adapted to operate faster than the other.

The guide structure 359 carries a valve guide 371 which may be made of fiber or other low friction material, and has an aperture 372 extending transversely thereof, which is filled with an absorbent material adapted ot retain a lubricant. Mounted upon the guide member 371 is a valve assembly that comprises an inverted cup-shaped metal member 373 which fits over said guide member in slidable relation. Vulcanized to the outer face of the cup-shaped member 373 is a circular rubber valve 374 having a thickened central portion 376, and a radially extending flange 377 which is adapted to contact the upper valve seat 354 in a manner which will be presently described. An annular metal grommet 378 is embedded in the valve 374 in order to stiffen the flange-like portion 377. The valve 374 has apertures 379 in the central portion which may be closed by a second flexible valve member 381 which slidably fits on the lower portion of the cup-shaped member 373. The rubber valve member 381 is prevented from axial disengagement from the cup-shaped member 373 by means of an annular outturned flange 382. A relief valve assembly 383 adapted to close in a direction opposite to that of valve 381 slidably engages the lower end of the guide member 359. It comprises a bearing member 384, and a spider member having arms 386 secured thereto, the outer ends of the latter being of such width as completely to overlie the ports 361. The spider arms 386 may be made of any suitable material having sufficient rigidity and preferably are made of fibre or Bakelite impregnated fabric. The valve member is biased to closed position through leaf springs 388 secured to the bearing member 384 and held under tension through an annular retainer member 389 which has offset portions 391 opposite the springs and which is secured to the valve casing by means of cap-screws 357.

The construction shown in Figure 39 is the same as that shown in Figures 35 to 38 inclusive, except that arms 392 of the spider have been provided with separate valve members 393. The operation of both forms is substantially identical.

In the operation of the structure shown in Figures 35 to 39, inclusive, the lower valve 381 is forced up from the valve seat 358 when the bellows is compressed, as when the wheel hits a high place in the road. Assuming the vehicle is not accelerating or decelerating and is not rounding a curve, the pendulum 364 will hang in the center of the casing 345 and will prevent valve 374 from closing against the upper valve seat 354. Upon compression of the bellows as above described, the lower valve 381 will be forced against the lower side of the upper valve 374 which will in turn be forced upward until the top of the cup-shaped member 373 contacts the lower end of the pendulum 364. Air will be free to flow around the valves from the bellows to the reservoir. Upon expansion of the bellows, as on the recoil movement, the valve 381 will be forced against the lower valve seat 358 as soon as the pressure on the reservoir side of the valve becomes greater than the pressure on the bellows side, to retard and delay the return of the air from the reservoir to the bellows. Since the valve 381 is very light, it is able to follow very fast fluctuations in the pressure difference between the bellows and reservoir.

Upon a succession of several very fast oscillations of the wheel causing alternate compression and expansion of the bellows, as where the wheel passes over a series of closely spaced bumps, a large quantity of the air would be forced from the bellows into the reservoir due to the valve 381, with the result that the bellows would tend to collapse if the valve assembly 383 was not provided to equalize the pressure between the bellows and reservoir. The tension on relief springs 388 is such that the valve 383 will open to allow flow of fluid pressure from the reservoir into the bellows when the pressure in the reservoir exceeds a predetermined value. One of the outstanding features of the construction shown in these figures is that the air pressure may very readily flow from the bellows to the reservoir upon the compression stroke, but the return of air pressure from the reservoir to the bellows is retarded and takes place during the latter part of the expansion half of the cycle, which gives very high shock absorbing qualities without substantial rebound for high velocity compressions of the bellows which are spaced by an appreciable time interval.

For very rapid high velocity compressions of the bellows occurring in rapid succession, the relief valve 383 will operate substantially to nullify the valve action of valve 381 in order that the air pressure in the bellows and in the reservoir is maintained substantially the same to prevent "bottoming" of the bellows, and yet maintain a comparatively soft ride.

When the vehicle is accelerating or decelerating, or rounding a curve, the pendulum 364 will swing into one of the recesses 368 so that the cup-shaped valve guide 373 will pass the lower end of the pendulum and upon subsequent compression of the bellows the valve 374 will be forced against the upper valve seat 354 and the valve 381 will slide up the valve guide member 373 and close the ports 379 in the valve 374 whereby communication from the bellows to the reservoir will be shut off. This results in an increase in rate of the bellows and prevents excessive deflection thereof when the vehicle is rounding a curve or when the brakes are applied.

A modified form of valve construction is shown in Figures 40 to 43, inclusive, in which no pendulum is used. In this modification the ends of the bellows are closed by end plates 395 and 396 having depressed central portions 397 and 398, respectively. The central depressions decrease the total enclosed volumetric capacity of the bellows which results in a higher rate since the percentage change in volume when the bellows is compressed is greater than without the depressed central portions. In the lower plate 396, the depressed portion extends inwardly at substantially a right angle as at 399 and co-operates with the usual clamping ring 401 to hold the bead of the bellows in fluid tight engagement. Likewise, the depressed portion 397 of upper plate extends substantially at right angles to the plane of the top and co-operates with a clamping ring 403 to hold the upper bead of the bellows.

The upper plate 395 has a centrally disposed aperture into which a cylindrical sleeve 404 is secured, as by welding. The upper end of the sleeve 404 has an integral out-turned flange 406 to which a cap 407 is secured by means of bolts 408. The cap 407 is maintained in fluid tight seal with the sleeve 404 by means of a gasket 409, and has a port 411 which is connected to the usual reservoir through a suitable pipe 412.

A casing 413 is secured to the cap 407 by means of screw threads or by welding and has a unit 414 secured thereto by means of cap screws 416 extending through the unit and threaded into ears 417 on the inner periphery of the casing 413. The unit 414 has a spider formation supporting a central guide structure 418. A valve guide 419 fits over a projection 418a which has its top peened over to hold the valve guide in position. The valve guide 419 has an upper flange 421 and a smaller flange 422 between which a flexible valve 423 is adapted slidably to oscillate. A relief valve 424 guided by a lower projection 418b on the guide structure 418 functions in a manner substantially identical to that shown in Figure 35, to allow a flow of fluid pressure from the reservoir to the bellows through ports 426.

Figure 41:
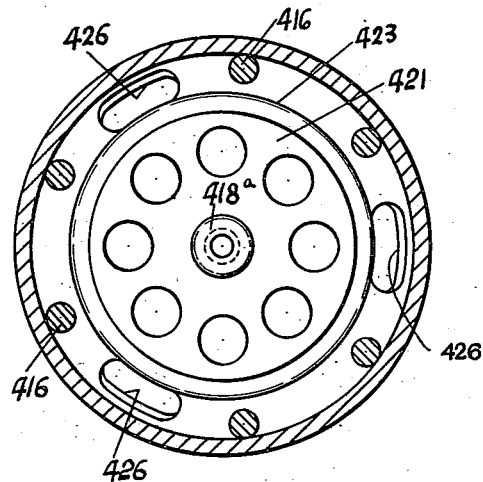
Figure 41 is an enlarged section on the line 41—41 of Figure 40.
Figure 42:
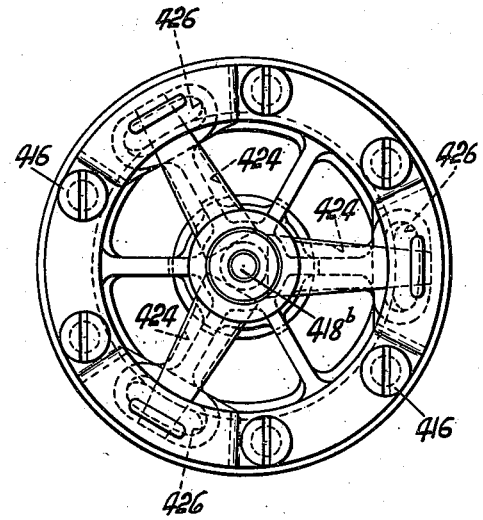
Figure 42 is an enlarged bottom view of the valve structure illustrated in Figure 40.
Figure 43:
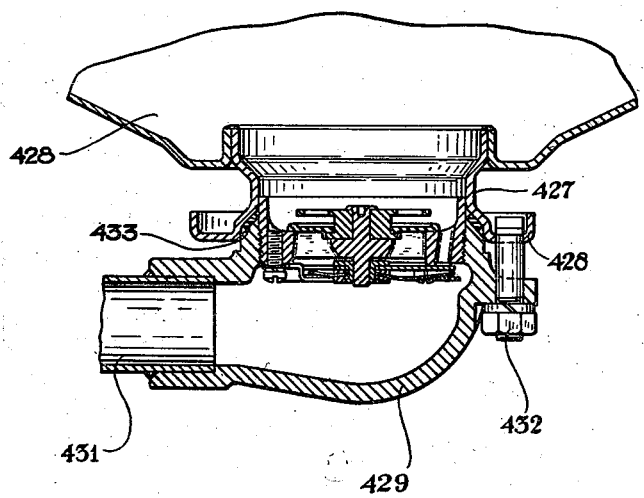
Figure 43 is a fragmentary vertical section of a valve assembly similar to that illustrated in Figure 40.

The construction shown in Figure 43 shows the valve construction of Figures 40 to 42, inclusive, arranged adjacent the reservoir instead of in the bellows. A thimble 427 that is secured in an aperture in the lower part of the reservoir has an outwardly turned flange 428 to which a hollow cap member 429, having a connection 431 with the bellows, is secured by means of bolts 432. A suitable gasket 433 forms a fluid tight seal between the cap 429 and the thimble.

One of the salient features of the present invention is its capacity to absorb impact shocks of different frequencies and/or velocities with substantially the same effectiveness. In other words, the damping factor of this system is such that resonance between the vibrations of the running gear relative to the vehicle body and the road irregularities is substantially eliminated. This is true because under conditions of relative oscillations, energy is stored which is later released in such a manner that a force resisting relative movement is built up which is out of phase with the relative movement, substantially independent of the frequency. Therefore, since the effectiveness of the elastic element of the suspension varies with the frequency of oscillation, there is no true fundamental frequency of the suspension, and sustained oscillations of the body and wheel are effectively minimized.

This condition is clearly shown in Figure 48, in which curve A shows the sinusoidal variation of compression and elongation of the bellows from approximately its normal load supporting length. Curve B represents the variation of pressure in the bellows and reservoir for the various lengths of the bellows shown in curve A when the compression and expansion takes place at a very low frequency approaching static conditions. Curve C represents the instantaneous pressures in the bellows when the compression and elongation of the bellows takes place at 160 cycles per minute, while the corresponding simultaneous instantaneous pressures in the reservoir are represented by curve D.

Although the data represented by the curves showing the relation between the dynamic and static characteristics of the pneumatic suspension were taken with sinusoidal movement of the bellows, which will seldom be encountered under actual operating conditions, the action would be similar for impact road shocks since any complicated oscillatory motion can be resolved into a series of sine waves acting simultaneously.

It is to be understood that the pressure curves in Figure 48 represent a composite of several hundred cycles at a constant frequency of 169 cycles per minute as an illustrative example, but the same general relation would be shown by using a frequency higher or lower than that used for these particular curves. For higher frequencies than that represented, the phase displacement would be greater with a correspondingly greater damping increment while for lower frequencies the time phase displacement and the damping increment would be less.

It is to be noted that both of the latter curves are unsymmetrical and aperiodic; that is, the successive loops of the curves are not of the same size and shape. It is to be particularly noted that the distance between the maxima and minima points of the curve C is much less than the distance between the maxima and minima points of curve D. In other words, the maximum point on the curve C occurs ahead of the maximum point on curve D by distance E, which represents time displacement, while the minimum point on curve C occurs ahead of the minimum point on curve D by an amount F which is substantially greater than time displacement E.

Several variables are responsible for the conditions represented by these curves, one of which is the effective piston area of the bellows for the various lengths under dynamic conditions, and another of which is the resistance to flow of the compressible fluid between the bellows and reservoir. As has been explained hereinbefore, the relation between the effective piston area and the length of the bellows may be varied by changing the design of the bellows as well as by changing the shape of the girdle ring and end rings. Since the resistance to the flow of air between the bellows and reservoir increases at a multiple power of the air velocity, the dynamic rate characteristics of the bellows can be greatly controlled by regulating or proportioning the connection between the reservoir and bellows. Also, by controlling the variation between the effective piston area and the flow resistance, a suspension system having a predetermined dynamic rate characteristic can be obtained. In such a suspension system the rate automatically varies with the type of impact shock encountered, and consequently very desirable characteristics are obtained.

Referring again to the curves C and D, the distances E and F represent the time-phase displacement between the instantaneous pressures in the bellows and reservoir which, together with the effective piston areas of the bellows, results in a varying force represented by the curve G, which is out of time phase with the body oscillations and has a smaller period. This results in a very high damping increment since as will be noted from the curves, the maximum and minimum points of the force curve G occur ahead of the maximum and minimum points on the displacement curve A, and the time phase displacement between the maximum points is less than the time phase displacement between the minimum points. This means that the elastic forces of the system are beginning to diminish before the body movement reverses which results in a greater delay in the return of the body to its normal load position, as well as a lower velocity whereby movement in the opposite direction beyond the normal load position is minimized. This is borne out by the comparison between the curves of Figure 44 and Figure 45 showing comparative drop test curves for the same automobile; with the conventional steel springs and shock absorbers in Figure 44 and with a pneumatic suspension in Figure 45. These curves show that the duration of the compression loop is almost one-tenth of a second longer with the pneumatic suspension than with the conventional springing, with a consequent increase in ride comfort in the former instance. Figure 45 also shows that there is substantially no rebound with the pneumatic suspension as compared to a large rebound with the conventional springing.

In Figures 44 and 45 the curves indicated as $H^1$ and $H^2$ respectively, represent the body movement, while the curves indicated at $K^1$ and $K^2$ respectively, represent the wheel movement plotted on a time axis. The curves are obtained by fixing one indicator on the body of the vehicle and another to move with the wheel, the indicators being adapted to make an indication on a recording tape moved at a predetermined speed by a clockwork mechanism. In these tests the vehicle is lifted by means of a suitable cable attached to the wheel. The vehicle is suddenly dropped to initiate the curves by merely cutting the cable.

The horizontal line indicated at L represents the normal load supporting position of the body and wheel. The points indicated at $M^1$ and $M^2$ and $N^1$ and $N^2$ respectively, represent the friction in the suspension mechanism; that is, the amount the body can be raised and lowered with respect to the normal load supporting position without the suspension overcoming the friction to return the body to a normal position. In other words, a force equivalent to that necessary to compress the spring an amount represented by the distance between one of these points and the zero axis is necessary to overcome the friction in the suspension. It is to be noted that the so-called body friction is greater in the case of a conventional suspension. The distance between the zero axis and the points indicated at $Y^1$ and $Y^2$ represents the amount of tire deflection between normal load and no load. In other words, the vehicle may be raised to the point $Y^1$ and $Y^2$ before the tire is out of contact with the ground.

Under actual operating conditions the upper end of the bellows is not fixed, as was the case in taking the data represented by the curves of Figure 48, and where the lower end was moved toward and away from the fixed upper end in a controlled manner. When the bellows is mounted as a vehicle suspension, the force of gravity is acting downwardly on both the running gear and body, while at the same time the resilient suspension acts against the force of gravity to maintain the body above the running gear and the resilient tire acts upwardly from the ground to support the running gear. Therefore, the resilient suspension between the running gear and body and the pneumatic tire between the running gear and the ground constitutes a compound elastic system having two elastic elements in series between the body and the ground with the running gear in between these two elements.

The deflection of the suspension and the tire will be inversely proportional to their respective rates for the corresponding lengths during compression and their rate of recovery or rebound will be proportional to their respective rates on the return movement. Proportioning the relative rates of the suspension and tire gives a flexible control over the ride of the vehicle and the so-called wheel "dance." Minimum wheel dance is highly desirable in order to maintain safe steering control at high speeds.

In the static condition the force of gravity alone is acting to cause compression of the elastic elements, while under dynamic conditions inertia forces, that is, the resistance to change in velocity of the mass, may also be added to gravity forces under road impacts. Therefore, an impact force acting upwardly against the tire causes the tire to oscillate relative to the ground and also relative to the body, the amount of the relative oscillations being dependent upon the relative masses and the relative dynamic rates of the pneumatic suspension and the tire.

In a vehicle suspension system there is the problem of preventing excessive rebound of the vehicle body while at the same time minimizing the tendency of the wheels to bounce excessively or to be lifted off the ground by the rebound of the body. Since the suspension has a non-linear rate characteristic, the force acting between the running gear and the body is not proportional to the compression and elongation thereof, and therefore the period and amplitude of each successive oscillation varies. During compression of the pneumatic suspension at high velocity, as under impact forces, there is the added rate due to the dynamic characteristic while upon elongation the rate decreases below the static rate because of the decrease in internal pressure in the bellows. Since the time of the complete oscillation is dependent upon amplitude of the oscillation and the amplitude of the successive oscillation is progressively reduced, the system has no fundamental periodic frequency. Consequently, even without friction, such a system is incapable of sustaining periodic vibrations and therefore the system has a very desirable inherent damping characteristic.

The tire with a single chamber has a rate characteristic which is substantially linear and therefore the force tending to cause rebound is substantially equal to the force producing the deflection. This causes substantial bouncing if there is no force to counteract this tendency. In the case of the pneumatic suspension between the running gear and the body, the suspension system stores part of the energy of the oscillations of the tire relative to the body and then releases this energy gradually to bring the body to normal load supporting position very gradually and without rebound. It will be understood that since there is no viscous drag in the pneumatic suspension, but instead a gradual release of the energy in such a manner that the rebound of the body is minimized without lifting the wheel off the ground, this gradual release of the energy of compression, stored in the form of air compressed in the suspension reservoir, at such a rate that the force between the body and running gear is not sufficiently greater than the force of gravity to impart high upward velocity of the body and consequently the body does not return substantially beyond the normal load supporting position. This is very clearly shown in Figure 45 where the movement of the body is not substantially above the zero or normal load supporting position. It is to be noted that the portion of the curve representing the return movement of the body is concave downwardly indicating that the velocity of the body in an upward direction is decreasing rapidly and the inertia force of the body acting upwardly near the end of the movement does not carry the body substantially above the zero and also the load on the wheel is not so diminished that the traction is substantially diminished.

What is claimed is:

1. In a valve structure of the character described, the combination of a casing, a pendulum mounted for universal angular movement therein, and a check valve for fluid pressure controlled by the angular position of said pendulum, said casing being so shaped in the region of the pendulum bob as to limit the angular movement of the pendulum at least in one direction.

2. A valve structure adapted to be operatively interposed between a flexible bellows and a reservoir for fluid in a pneumatic suspension for vehicle, said valve structure comprising a casing, a valve therein comprising upper and lower valve seats, a valve disc between said seats exposed to a velocity head of fluid from the bellows or from the reservoir and seatable alternatively on said valve seats, an oscillatory member in said casing controlling the seating of said valve disc on the upper valve seat, and a second valve in said casing below said first mentioned valve, said second valve comprising an upper valve seat, and a weighted inertia valve disc below the same, the latter valve disc being adapted to be seated, to prevent the passage of fluid from the bellows to the first mentioned valve, by reason of its own inertia when the entire valve structure suddenly drops due to extremely rough conditions in a roadway.

3. A combination as defined in claim 2 including a supporting structure for the inertia valve disc, which structure is so constructed as to permit fluid to pass said disc in both directions when said disc is not engaged with the valve seat above the same.

4. A combination as defined in claim 2 in which the casing is formed with by-passes between the two valves to permit the upper valve to function, under a restricted velocity head of fluid from the bellows, when the inertia valve is closed.

5. A valve structure adapted to be operatively interposed between a bellows and a reservoir for fluid in a pneumatic suspension for vehicles, said valve structure comprising a check valve exposed to a pressure head of fluid from the bellows and from the reservoir, an oscillatory member controlling the operation of said check valve, and a supplemental valve controlled by differential fluid pressure between the bellows and reservoir.

6. A valve structure adapted to be operatively interposed between a bellows and a reservoir for fluid in a pneumatic suspension for vehicles, said valve structure comprising a check valve exposed to a pressure head of fluid from the bellows and from the reservoir, an oscillatory member controlling the operation of the said check valve when the pressure head is flowing toward the reservoir, and a supplemental valve openable to pass fluid rapidly from the reservoir to the bellows when the fluid in said reservoir exceeds a determinate pressure.

7. A valve structure adapted to be operatively interposed between a bellows and a reservoir for fluid in a pneumatic suspension for vehicles, said valve structure comprising a casing, a check valve therein exposed to a pressure head of fluid alternatively from the bellows and from the reservoir, an oscillatory member controlling the operation of said check valve when the pressure head is flowing toward the reservoir, and a supplemental, spring-loaded valve in said casing on the reservoir side of said check valve.

8. A valve structure of the character described comprising a casing, a check valve therein comprising two valve discs movable from and toward each other and so constructed and arranged as to be exposed, in succession, to pressure heads of fluid flowing alternatively from one direction and from the opposite direction, and an oscillatory member controlling the movement of one of said discs in one direction.

9. A valve structure of the character described comprising a casing, a check valve therein comprising vertically spaced apart valve seats, a valve disc seatable on the lower valve seat, a superposed valve disc seatable on the upper valve seat, means positioned between said valve seats adapted to support the superposed disc and to limit the upward movement of the lower disc, and so constructed as to permit fluid to pass the superposed disc when so supported, and an oscillatory member controlling the seating of the superposed disc on the upper valve seat.

10. A valve structure of the character described comprising a casing having a vertical axial passage therethrough, concentric spaced-apart valve seats around said passage, a chamber between said valve seats open to said axial passage, a supporting structure extending radially across said chamber at a plurality of spaced apart points, a valve disc seatable on the lower valve seat and movable between the latter and said supporting structure, a superposed valve disc resting by gravity upon said supporting structure and movable between the latter and the upper valve seat, and an oscillatory member controlling the seating of the superposed valve disc on the upper valve seat.

11. A combination as defined in claim 9 including portions on the superposed valve disc projecting locally at a plurality of points beyond the perimeter of the lower valve disc so as to be exposed to a pressure head of fluid from below when the lower valve disc has been moved upwardly into engagement with supporting structure for the superposed disc.

12. A valve structure of the character described comprising a casing having a vertical axial passage therethrough, a pair of axially aligned, vertically spaced apart valve discs in said passage and each exposed to pressure heads of fluid from above and from below, a valve seat above the upper valve disc, supporting means engaging the perimeter of the upper valve disc at spaced points for supporting the same, a yielding support for the lower valve disc from which support it may be lifted by a pressure head of fluid from below, said passage being flared below the lower valve disc so that movement thereof, against its yielding support, will provide an opening of progressively increasing area for the passage of fluid, and an oscillatory member controlling the seating of the upper valve disc on the upper valve seat.

13. A valve structure of the character described comprising a casing formed with a vertical axial passage therethrough, axially spaced apart valve seats about said passage, a valve of low mass between said seats and engageable alternatively therewith, said valve being adapted for high frequency operation under a pressure head of fluid in said passage, said valve comprising rubber at least in the regions thereof that engage said valve seats.

14. A valve structure of the character described comprising a casing having a vertical axial passage therethrough, axially spaced apart valve seats about said passage, said valve seats being disposed in planes that are at an angle to each other, and a flap-valve between said seats and hinged at one side so as to be capable of oscillatory movement, said valve being engageable alternatively with said valve seats under a pressure head of fluid in said passage.

15. A valve structure of the character described comprising a casing having a vertical axial passage therethrough, axially spaced apart valve seats about said passage, the planes of said valve seats being disposed at an angle to each other, a hingedly mounted flap valve between said valve seats capable of oscillatory movement so as to seat alternatively on said valve seats under a pressure head of fluid in said passage, and yielding means normally supporting said valve out of engagement with both valve seats.

16. A valve structure of the character described comprising a casing having a passage for fluid therethrough, axially spaced apart valve seats about said passage, the planes of the respective valve seats being disposed at an angle to each other, a valve between said valve seats, and a rubber structure hingedly connecting one side of the valve to the casing whereby a pressure head of fluid in the passage oscillates the valve so as alternatively to engage one of said valve seats.

17. A combination as defined in claim 16 in which the passage in the casing is vertically disposed and the rubber hinge supports the valve normally in horizontal position.

18. A valve structure of the character described comprising a casing having a passage for fluid therethrough, axially spaced apart valve seats about said passage, the planes of the respective valve seats being disposed at an angle to each other, and a valve member arranged for oscillatory movement between said valve seats, said valve member comprising a facing of resilient rubber for engagement with said valve seats and an integral hinge portion of rubber fixedly secured to the casing and supporting said valve member.

19. A valve structure of the character described comprising a casing having a vertically disposed fluid passage therethrough, a pair of axially spaced apart valve seats about said passage, a pair of full floating valve discs between said valve seats, each disc being engageable with its adjacent valve seat when moved by a pressure head of fluid in said passage, and a member between said valve discs engageable therewith for limiting their movement toward the other valve seat.

20. A combination as defined in claim 19 in which the member between the valve discs is so constructed as to engage the latter at spaced points thereon so as not to obstruct the passage of fluid around the discs when the latter are engaged therewith.

21. A vehicle suspension comprising a pneumatic cushioning device, a reservoir, a conduit between said cushioning device and said reservoir, an unbiased, substantially inertia-less check valve in said conduit for closing under influence of a greater pressure in said reservoir than in said cushioning device, and a biased check valve in said conduit in parallel relation with said inertia-less check valve adapted to open under a predetermined maximum pressure in said reservoir greater than in said cushioning means.

22. A vehicle suspension comprising a pneumatic cushioning device, a reservoir, a conduit between said cushioning device and said reservoir, a valve structure in said conduit having two confronting valve seats, a substantially inertia-less check valve unbiased except for the action of gravity adapted to seat on one of said valve seats under influence of a greater pressure in said reservoir than in said cushioning device, means associated with said inertia-less valve for preventing said valve from seating on the other valve seat except under the simultaneous influence of a greater pressure in said cushioning means than in said reservoir and acceleration in a horizontal plane or rolling movement, and a biased check valve in said conduit and in parallel relation with the valve seat closed by said inertia-less valve under the influence of a greater pressure in said reservoir than in said cushioning device for establishing a predetermined maximum pressure difference between said reservoir and said cushioning means.

23. A pneumatic suspension system comprising a pneumatic load supporting device and a chamber in fluid communication with said chamber to receive air forced from said load supporting device upon compression thereof, means responsive to a very small pressure differential to permit flow from said supporting device to said chamber while preventing substantial flow in the opposite direction, and means responsive to predetermined pressure differential to permit flow in the opposite direction.

24. A pneumatic suspension system adapted to be connected between the running gear and frame of a vehicle comprising a pneumatic cushioning device, a reservoir, fluid communicating means connecting said reservoir and said cushioning means, means in said connection for maintaining the pressure in said reservoir greater than the pressure in said cushioning means during more than one-half of the sine wave cycle, when the cushioning means is compressed and expanded according to a sine law.

25. A pneumatic suspension system for vehicles and the like comprising a load supporting fluid container, a reservoir, a conduit connecting said casing and reservoir, a valve structure in said conduit comprising a casing, a check valve therein, having two valve members each of which is adapted to seat upon one of two valve seats facing each other when subjected to pressure heads of fluid flowing in opposite directions, and an oscillatory element controlling the movement of one of said members toward its respective seat.

26. A valve structure of the character described comprising a casing, a check valve therein comprising two valve members, each of which is adapted to seat upon one of two valve seats facing each other when subjected to pressure heads of fluid flowing in opposite directions, and an oscillatory element controlling the movement of one of said members toward its respective seat.

27. A valve structure of the character described, comprising a vertically disposed casing formed with a vertical axial passage therethrough, axially spaced apart valve seats about said passage, and a valve of low mass positioned between said valve seats and engageable alternately therewith, said valve being adapted for high frequency operation under the impetus of a pressure head of fluid moving in said passage and means for suppressing sound incidental to the seating of the valve.

28. A vehicle suspension comprising a pneumatic cushioning device, a reservoir, a conduit between said cushioning device and said reservoir, two check valves arranged in parallel in said conduit and adapted to open in opposite directions, one of said check valves being biased to a greater extent than the other of said check valves.

29. A vehicle suspension comprising a pneumatic cushioning device, a reservoir, a conduit between said cushioning device and said reservoir, two check valves arranged in parallel in said conduit between said cushioning device and said reservoir and adapted to open in opposite directions, one of said valves being adapted to open away from said reservoir, said latter valve having a greater pre-determined bias than said other valve.

30. A vehicle suspension comprising a pneumatic spring and a reservoir adapted to contain a compressible fluid therein, said pneumatic spring and said reservoir being associated in fluid communication relation, means responsive to vertical accelerations and operably associated between said pneumatic spring and said reservoir for automatically varying the spring rate by restricting the compression or expansion of the fluid to either said pneumatic spring or said reservoir or to permit compression or expansion within the combined volume of said spring and said reservoir.

31. A vehicle suspension comprising a pneumatic spring device and a reservoir adapted to have a compressible fluid therein and closed to the atmosphere, means connecting said reservoir and said spring device, a valve between said spring device and said reservoir normally in open position, said valve adapted to be closed in response to vertical accelerations and to be maintained closed by such accelerations except under conditions where the pressure differential on opposite sides of the valve overcomes the force of such acceleration and opens said valve.

ROY W. BROWN.